(12) United States Patent
Ryu et al.

(10) Patent No.: US 9,509,166 B2
(45) Date of Patent: Nov. 29, 2016

(54) APPARATUS AND METHOD FOR WIRELESS POWER TRANSMISSION

(75) Inventors: Young Ho Ryu, Yongin-si (KR); Eun Seok Park, Yongin-si (KR); Sang Wook Kwon, Seongnam-si (KR); Yun Kwon Park, Dongducheon-si (KR); Young Tack Hong, Seongnam-si (KR); Ki Young Kim, Yongin-si (KR); Nam Yun Kim, Seoul (KR); Dong Zo Kim, Yongin-si (KR); Jin Sung Choi, Gimpo-si (KR); Chang Wook Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 692 days.

(21) Appl. No.: 13/470,417

(22) Filed: May 14, 2012

(65) Prior Publication Data

US 2012/0293005 A1 Nov. 22, 2012

(30) Foreign Application Priority Data

May 16, 2011 (KR) .................. 10-2011-0045824

(51) Int. Cl.
*H02J 7/02* (2016.01)
*B60L 11/18* (2006.01)
*H02J 5/00* (2016.01)

(52) U.S. Cl.
CPC ............. *H02J 7/025* (2013.01); *B60L 11/182* (2013.01); *B60L 11/1812* (2013.01); *B60L 11/1833* (2013.01); *B60L 11/1846* (2013.01); *H02J 5/005* (2013.01); *B60L 2210/10* (2013.01); *B60L 2210/30* (2013.01); *B60L 2210/40* (2013.01); *Y02T 10/7005* (2013.01); *Y02T 10/7072* (2013.01); *Y02T 10/7216* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01);
(Continued)

(58) Field of Classification Search
CPC ......... H01F 38/14; H02J 5/005; H02J 17/00; B60L 11/182
USPC .......................................... 307/104
See application file for complete search history.

(56) References Cited

U.S. PATENT DOCUMENTS

| 6,160,374 A * | 12/2000 | Hayes et al. .................. 320/108 |
| 2009/0096413 A1* | 4/2009 | Partovi et al. ................ 320/108 |
| 2010/0117454 A1* | 5/2010 | Cook .................. G06K 7/0008 307/104 |

(Continued)

FOREIGN PATENT DOCUMENTS

| JP | 05-015065 A | 1/1993 |
| JP | 2002-354711 A | 12/2002 |

(Continued)

*Primary Examiner* — Thienvu Tran
*Assistant Examiner* — David M Stables
(74) *Attorney, Agent, or Firm* — NSIP Law

(57) ABSTRACT

An apparatus and method for efficiently, wirelessly transmitting a power to a plurality of target devices are provided. A wireless power transmitter may include: a source resonator configured to wirelessly transmit energy to a target device with at least one target resonator, the energy being stored in a capacitor; and a feeding unit configured to generate an induced current flowing in the source resonator in the same direction as a direction of an input current flowing in a transmission line, the feeding unit being electrically connected to the capacitor and forming a closed loop with the source resonator.

19 Claims, 28 Drawing Sheets

(52) U.S. Cl.
CPC ............... *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 2010/0127660 A1* | 5/2010 | Cook ................... | H01Q 1/248 320/108 |
| 2010/0181961 A1* | 7/2010 | Novak et al. ................ | 320/108 |
| 2010/0277003 A1* | 11/2010 | Von Novak et al. ......... | 307/104 |
| 2010/0323616 A1* | 12/2010 | Von Novak et al. ......... | 455/41.1 |
| 2011/0053500 A1* | 3/2011 | Menegoli et al. ........... | 455/41.1 |
| 2011/0062788 A1* | 3/2011 | Chen et al. ................... | 307/104 |
| 2011/0080056 A1* | 4/2011 | Low et al. .................... | 307/104 |
| 2012/0043826 A1* | 2/2012 | Saitoh .......................... | 307/104 |

FOREIGN PATENT DOCUMENTS

| | | |
|---|---|---|
| JP | 2002-354713 A | 12/2002 |
| JP | 2008-312357 A | 12/2008 |
| JP | 2010-063245 A | 3/2010 |

\* cited by examiner

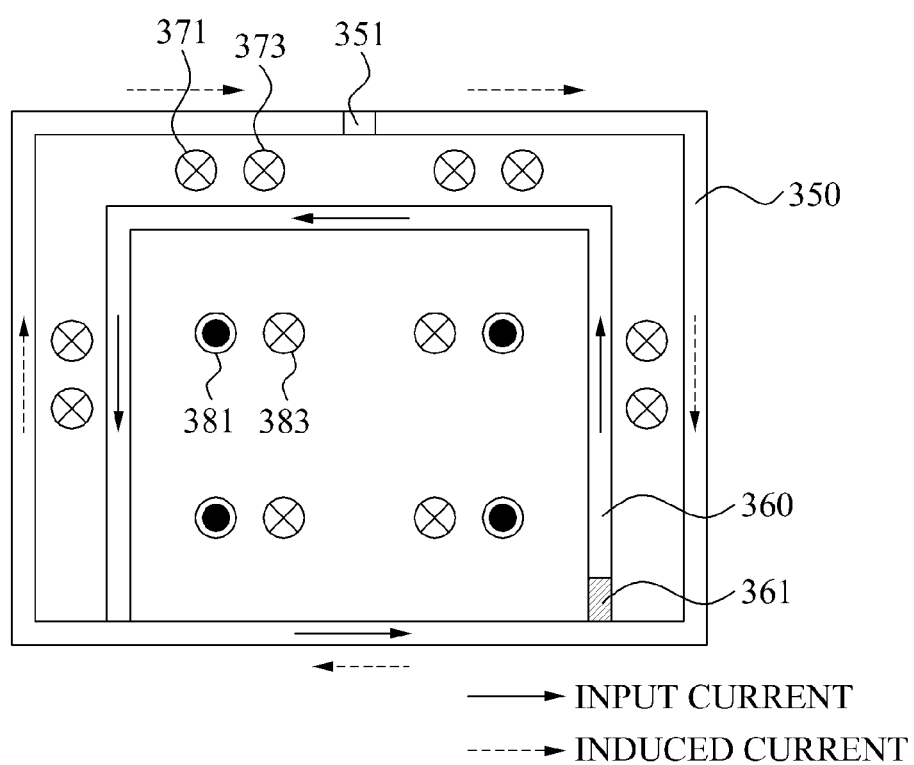

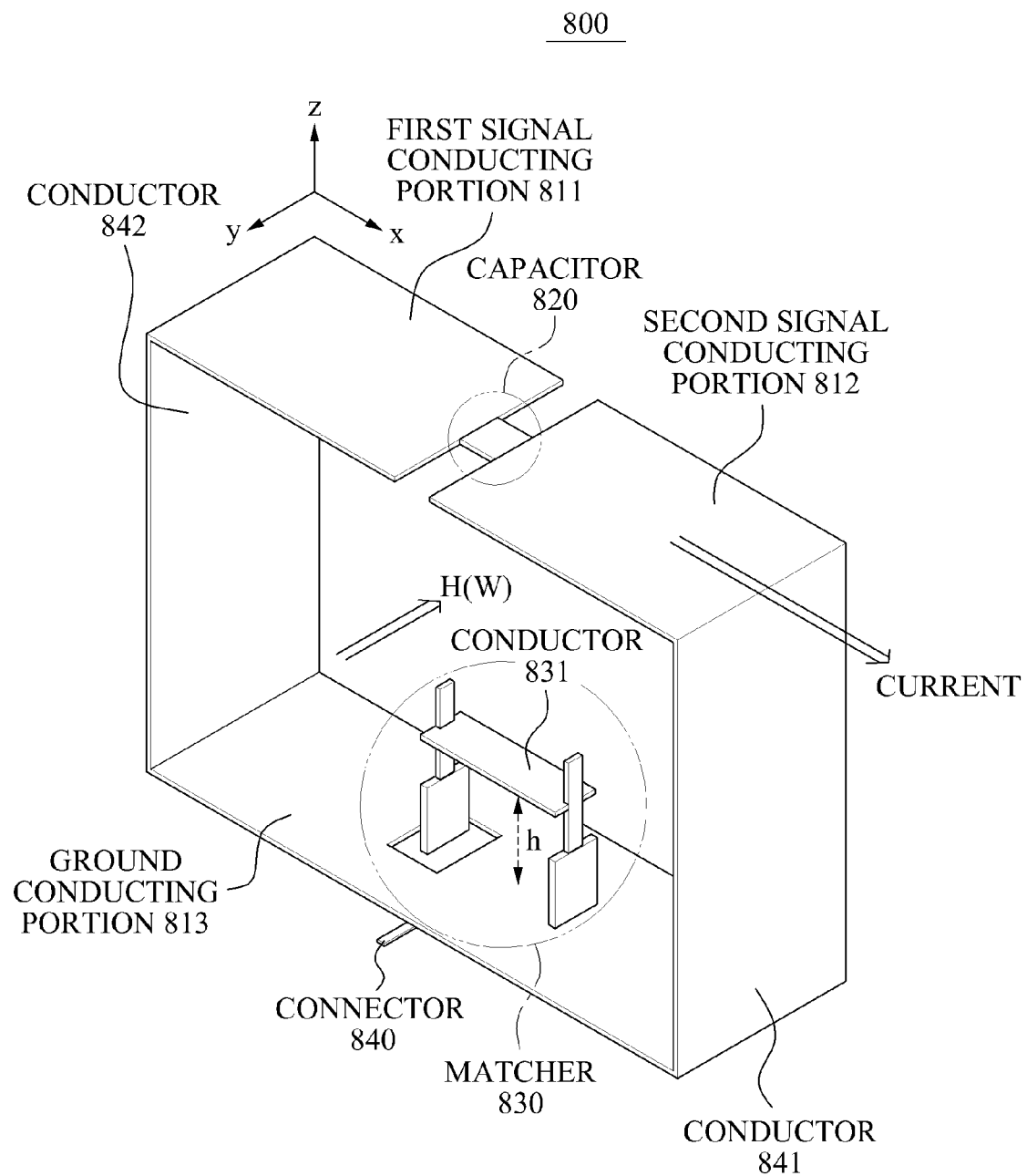

1000

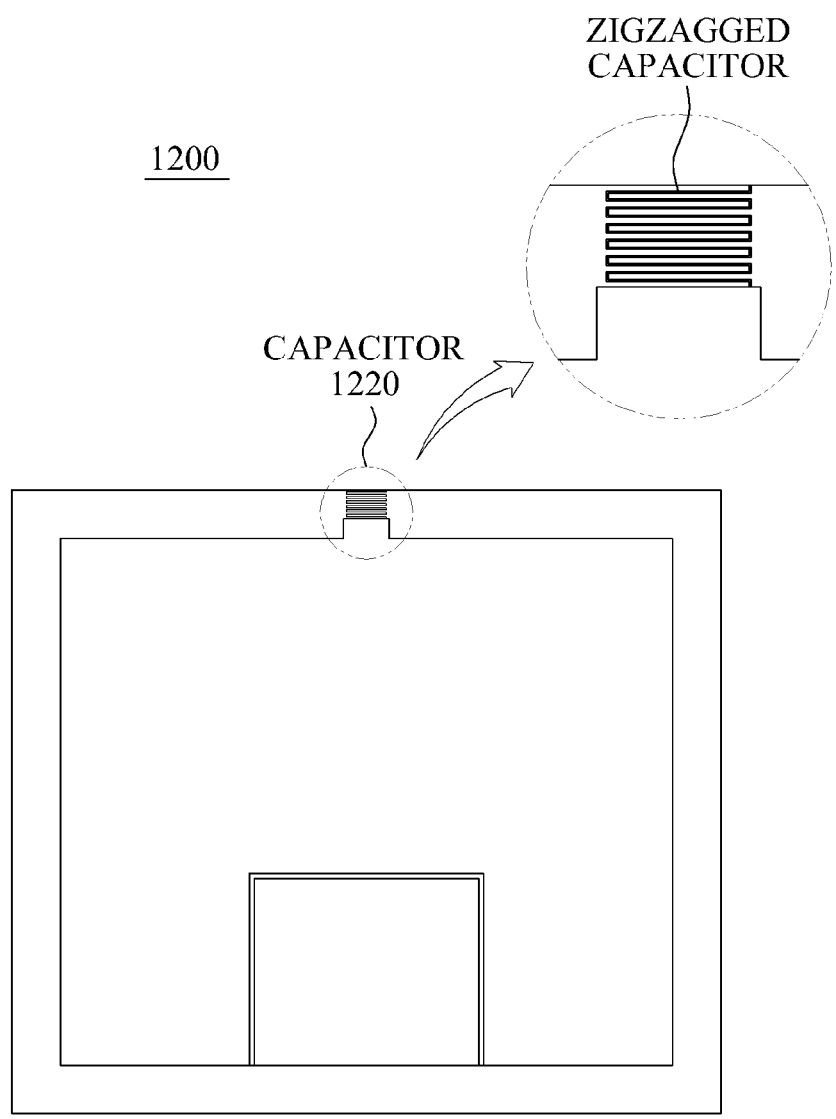

APPARATUS AND METHOD FOR WIRELESS POWER TRANSMISSION

CROSS-REFERENCE TO RELATED APPLICATION(S)

This application claims the benefit under 35 U.S.C. §119 (a) of Korean Patent Application No. 10-2011-0045824, filed on May 16, 2011, in the Korean Intellectual Property Office, the entire disclosure of which is incorporated herein by reference for all purposes.

BACKGROUND

1. Field

The following description relates to wireless power transmission.

2. Description of Related Art

Wireless power refers to energy that is transferred from a wireless power transmitter to a wireless power receiver, for example, through magnetic coupling. Accordingly, a wireless power transmission system may include a source device and a target device. The source device may wirelessly transmit a power, and the target device may wirelessly receive power.

The source device includes a source resonator, and the target device includes a target resonator. Magnetic coupling or resonance coupling may be formed between the source resonator and the target resonator. Due to characteristics of a wireless environment, the distance between the source resonator and the target resonator may vary over time, and matching requirements to match the source resonator and the target resonator may also be changed.

SUMMARY

According to one general aspect, a wireless power transmitter may include: a source resonator configured to wirelessly transmit energy to a target device with at least one target resonator, the energy being stored in a capacitor; and a feeding unit configured to generate an induced current flowing in the source resonator in the same direction as a direction of an input current flowing in a transmission line, the feeding unit being electrically connected to the capacitor and forming a closed loop with the source resonator.

The source resonator may include: a first transmission line comprising a first signal conducting portion, a second signal conducting portion, and a first ground conducting portion, the first ground conducting portion corresponding to the first signal conducting portion and the second signal conducting portion; a first conductor electrically connecting the first signal conducting portion to the first ground conducting portion; a second conductor electrically connecting the second signal conducting portion to the first ground conducting portion; and the capacitor inserted between the first signal conducting portion and the second signal conducting portion, in series with respect to current flowing through the first signal conducting portion and the second signal conducting portion.

The first transmission line, the first conductor, and the second conductor may form a loop structure.

The feeding unit may include: a second transmission line comprising a third signal conducting portion, a fourth signal conducting portion, and a second ground conducting portion, the second ground conducting portion corresponding to the third signal conducting portion and the fourth signal conducting portion; a third conductor electrically connecting the third signal conducting portion to the second ground conducting portion; a fourth conductor electrically connecting the fourth signal conducting portion to the second ground conducting portion; a fifth conductor electrically connecting the first signal conducting portion to the third signal conducting portion; and a sixth conductor electrically connecting the second signal conducting portion to the fourth signal conducting portion.

The wireless power transmitter may further include: a controller configured to match an input impedance of the source resonator to an output impedance of a power amplifier, by adjusting an area of a region between the source resonator and the feeding unit.

The controller may determine the input impedance of the source resonator by adjusting the distance between the fourth signal conducting portion and the second ground conducting portion, and the distance between the third conductor and the fourth conductor, or both.

The fifth conductor or the sixth conductor may be operated as an input port to receive an input of a radio frequency (RF) signal.

The fifth conductor and the sixth conductor may be connected in parallel to both ends of the capacitor so that current flowing in the fifth conductor is electrically isolated by the capacitor from current flowing in the sixth conductor.

The controller may control a magnetic field formed within the source resonator to be uniformly distributed based on a direction of the induced current flowing in the source resonator and a direction of the input current flowing in the feeding unit.

The source resonator may be configured as a spiral resonator in which a coil is wound in a spiral shape.

The spiral resonator may include a capacitor that is electrically connected between a winding starting end of the coil and a winding finishing end of the coil.

The feeding unit may be located within the spiral resonator.

The feeding unit may be located outside the spiral resonator.

According to another general aspect, a wireless power transmission method may include: wirelessly transmitting energy to a target device through a magnetic coupling with at least one target resonator, the energy being stored in a capacitor of a source resonator; and generating, by a feeding unit, an induced current flowing in the source resonator in the same direction as a direction of an input current flowing in a transmission line, the feeding unit being electrically connected to both ends of the capacitor, wherein the source resonator includes: a first transmission line comprising a first signal conducting portion, a second signal conducting portion, and a first ground conducting portion, the first ground conducting portion corresponding to the first signal conducting portion and the second signal conducting portion; a first conductor electrically connecting the first signal conducting portion to the first ground conducting portion; a second conductor electrically connecting the second signal conducting portion to the first ground conducting portion; and the capacitor inserted between the first signal conducting portion and the second signal conducting portion, in series with respect to a current flowing through the first signal conducting portion and the second signal conducting portion, and wherein the feeding unit comprises: a second transmission line comprising a third signal conducting portion, a fourth signal conducting portion, and a second ground conducting portion, the second ground conducting portion corresponding to the third signal conducting portion and the fourth signal conducting portion; a third conductor electrically connecting the third signal conducting portion to the second ground conducting portion; a fourth conductor electrically connecting the fourth signal conducting portion to the second ground conducting portion; a fifth conductor electrically connecting the first signal conducting portion to the third signal conducting portion; and a sixth conductor electrically connecting the second signal conducting portion to the fourth signal conducting portion.

The wireless power transmission method may further include: matching an input impedance of the source resonator to an output impedance of a power amplifier, by adjusting an area of a region between the source resonator and the feeding unit.

The wireless power transmission method may further include: determining the input impedance of the source resonator by adjusting the distance between the fourth signal conducting portion and the second ground conducting portion, the distance between the third conductor and the fourth conductor, or both.

The wireless power transmission method may further include: controlling a magnetic field formed within the source resonator to be uniformly distributed based on a direction of the induced current flowing in the source resonator and a direction of the input current flowing in the feeding unit.

According to yet another general aspect, a wireless power receiver may include: a target resonator configured to wirelessly receive energy from a source resonator; and a feeding unit configured to generate an induced current in the same direction as a direction of an input current flowing in a transmission line of the target resonator, the feeding unit being electrically connected to a capacitor included in the target resonator and forming a closed loop with the target resonator.

The target resonator may include: a first transmission line comprising a first signal conducting portion, a second signal conducting portion, and a first ground conducting portion, the first ground conducting portion corresponding to the first signal conducting portion and the second signal conducting portion; a first conductor electrically connecting the first signal conducting portion to the first ground conducting portion; a second conductor electrically connecting the second signal conducting portion to the first ground conducting portion; and the capacitor inserted between the first signal conducting portion and the second signal conducting portion, in series with respect to current flowing through the first signal conducting portion and the second signal conducting portion.

The feeding unit may include: a second transmission line comprising a third signal conducting portion, a fourth signal conducting portion, and a second ground conducting portion, the second ground conducting portion corresponding to the third signal conducting portion and the fourth signal conducting portion; a third conductor electrically connecting the third signal conducting portion to the second ground conducting portion; a fourth conductor electrically connecting the fourth signal conducting portion to the second ground conducting portion; a fifth conductor electrically connecting the first signal conducting portion to the third signal conducting portion; and a sixth conductor electrically connecting the second signal conducting portion to the fourth signal conducting portion.

The wireless power receiver may further include: a controller configured to match an output impedance of the target resonator to an input impedance of the feeding unit, by adjusting an area of a region between the target resonator and the feeding unit.

Other features and aspects will be apparent from the following detailed description, the drawings, and the claims.

BRIEF DESCRIPTION OF THE DRAWINGS

FIGS. 3A and 3B are diagrams illustrating a distribution of a magnetic field in a feeder and a source resonator.

Figure 1:
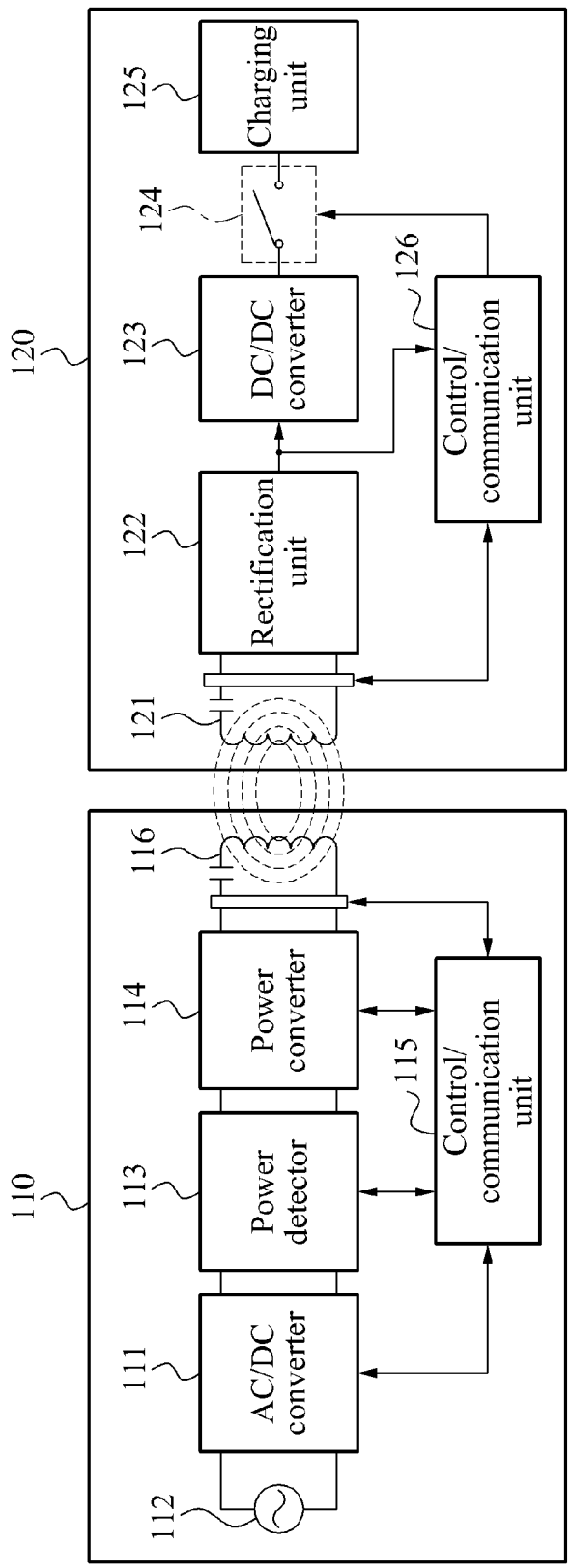
FIG. 1 is a diagram illustrating a wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates a wireless power transmission system.

Referring to FIG. 1, the wireless power transmission system includes a source device 110, and a target device 120.

The source device 110 may include an alternating current-to-direct current (AC/DC) converter 111, a power detector 113, a power converter 114, a control and communication (control/communication) unit 115, and a source resonator 116.

The target device 120 may include a target resonator 121, a rectification unit 122, a DC-to-DC (DC/DC) converter 123, a switch unit 124, a charging unit 125, and a control/communication 126.

The AC/DC converter 111 may generate a DC voltage by rectifying an AC voltage (e.g., in a band of tens of hertz (Hz)) output from a power supply 112. The AC/DC converter 111 may output DC voltage of a predetermined level, and/or may adjust an output level of DC voltage based on the control of the control/communication unit 115.

The power detector 113 may be configured to detect an output current and an output voltage of the AC/DC converter 111, and may transfer, to the control/communication unit 115, information on the detected current and the detected voltage. Additionally, the power detector 113 may detect an input current and an input voltage of the power converter 114.

The power converter 114 may generate power by converting DC voltage of a predetermined level to AC voltage, for example, using a switching pulse signal in a band of a few megahertz (MHz) to tens of MHz.

Specifically, the power converter 114 may convert DC voltage to AC voltage, using a resonant frequency, and may generate communication power used for communication, charging power used for charging, or both. The communication power and the charging power may be used in the target device 120. The communication power refers to energy used to activate a communication module and a processor of the target device 120 and accordingly, may be referred to as a "wake-up power." Additionally, the communication power may be transmitted in the form of a constant wave (CW) for a predetermined period of time. The charging power refers to energy used to charge a battery connected to the target device 120 or a battery included in the target device 120. The charging power may continue to be transmitted for a predetermined period of time, at a higher power level than the communication power. For example, the communication power may have a power level of 0.1 Watt (W) to 1 W, and the charging power may have a power level of 1 W to 20 W.

The control/communication unit 115 may control a frequency of a switching pulse signal. Under the control of the control/communication unit 115, the frequency of the switching pulse signal may be determined. By controlling the power converter 114, the control/communication unit 115 may generate a modulation signal to be transmitted to the target device 120. For example, the control/communication unit 115 may transmit various messages to the target device 120 using an in-band communication. Additionally, the control/communication unit 115 may detect a reflected wave, and may demodulate a signal received from the target device 120 through an envelope of the detected reflected wave.

The control/communication unit 115 may generate a modulation signal for in-band communication, using various schemes. To generate a modulation signal, the control/communication unit 115 may turn ON or OFF a switching pulse signal, or may perform delta-sigma modulation. Additionally, the control/communication unit 115 may generate a pulse-width modulation (PWM) signal with a predetermined envelope.

The term "in-band" communication(s), as used herein, means communication(s) in which information (such as, for example, control information, data and/or metadata) is transmitted in the same frequency band, and/or on the same channel, as used for power transmission. According to one or more embodiments, the frequency may be a resonance frequency. And, the term "out-band" communication(s), as used herein, means communication(s) in which information (such as, for example, control information, data and/or metadata) is transmitted in a separate frequency band and/or using a separate or dedicated channel, than used for power transmission.

The control/communication unit 115 may perform an out-band communication that employs a separate communication channel, instead of a resonant frequency. The control/communication unit 115 may include a communication module, such as one configured to process ZigBee, Bluetooth, Wi-Fi, and Wi-Max communications and the like. The control/communication unit 115 may transmit or receive data to or from the target device 120 using the out-band communication.

The source resonator 116 may transfer an electromagnetic energy to the target resonator 121. For example, the source resonator 116 may transfer, to the target device 120, the communication power or charging power, using a magnetic coupling with the target resonator 121.

The target resonator 121 may receive the electromagnetic energy from the source resonator 116. In some implementations, the target resonator 121 may receive, from the source device 110, the communication power or charging power, using the magnetic coupling with the source resonator 116. Additionally, the target resonator 121 may receive various messages from the source device 110 using the in-band communication.

The rectification unit 122 may generate DC voltage by rectifying AC voltage received from the target resonator 121.

The DC/DC converter 123 may adjust the level of the DC voltage output from the rectification unit 122, based on the capacity of the charging unit 125. For example, the DC/DC converter 123 may adjust the level of the DC voltage output from the rectification unit 122 from 3 volt (V) to 10 V.

The switch unit 124 may be turned ON or OFF under the control of the control/communication unit 126. When the switch unit 124 is turned OFF, the control/communication unit 115 of the source device 110 may detect a reflected wave. And, when the switch unit 124 is turned OFF, the magnetic coupling between the source resonator 116 and the target resonator 121 may be eliminated.

The charging unit 125 may include at least one battery. The charging unit 125 may charge the at least one battery using DC voltage output from the DC/DC converter 123.

The control/communication unit 126 may perform in-band communication for transmitting or receiving data using a resonant frequency. During the in-band communication, the control/communication unit 126 may demodulate a received signal by detecting a signal between the target resonator 121 and the rectification unit 122, or detecting an output signal of the rectification unit 122. In other words, the control/communication unit 126 may demodulate a message received using the in-band communication.

Additionally, the control/communication unit 126 may adjust an impedance of the target resonator 121, to modulate a signal to be transmitted to the source device 110. The control/communication unit 126 may modulate the signal to be transmitted to the source device 110, by turning ON or OFF the switch unit 124. For example, the control/communication unit 126 may increase the impedance of the target resonator 121 so that a reflected wave may be detected from the control/communication unit 115 of the source device 110. Depending on whether the reflected wave is detected, the control/communication unit 115 may detect a binary number (e.g., "0" or "1").

The control/communication unit 126 may also perform an out-band communication that employs a communication channel. The control/communication unit 126 may include a communication module, such as one configured to process ZigBee, Bluetooth, Wi-Fi and Wi-Max communications and the like. The control/communication unit 126 may transmit or receive data to or from the source device 110, using the out-band communication.

FIGS. 2A through 2D illustrate feeding and impedance matching in a wireless power transmission scheme employing resonance.

When wireless power transmission employs resonance, power may be supplied to a source resonator through a feeder. The feeder may be implemented using the following schemes:

First, a separate feeder may be implemented outside the source resonator. For example, when a radio frequency (RF) signal is input to the feeder, an induced current may be generated in the source resonator due to current flowing through the feeder, and the source resonator may receive power supplied by the induced current. Impedance matching may be performed by adjusting the size of the feeder and/or the distance between the source resonator and the feeder. When the impedance matching is performed as described above, in response to an input impedance changed based on a distance between the source resonator and a target resonator, and based on a load connected to the target resonator, the need for a matching network may be minimized. However, performing of the impedance matching by adjusting the size of the feeder and the distance between the source resonator and the feeder has a disadvantage that the volume of a system is increased. Additionally, a magnetic field formed in the feeder may have an opposite phase to a phase of a magnetic field that is induced by the Faraday's law and formed in the source resonator and accordingly, the strength of the magnetic field within the source resonator may be reduced. Since the wireless power transmission efficiency is in proportion to the strength of the magnetic field formed in the source resonator, the wireless power transmission efficiency may also be reduced.

Second, feeding may be performed on the source resonator, without a feeder. In response to an RF signal, power may be supplied to the source resonator. In some instances, impedance matching may be performed using a separate matching network. Additionally, an input impedance may be changed based on a distance between the source resonator and a target resonator, and based on a load connected to the target resonator. The matching network may need to perform the impedance matching based on a change in the input impedance, which may result in a loss. In addition, the matching network may be complicated, in order to perform impedance matching suitable for various changes in the input impedance.

The target resonator may form a magnetic field due to current induced through magnetic coupling with the source resonator, and may generate an induced current in the feeder by the formed magnetic field.

Figure 2A:
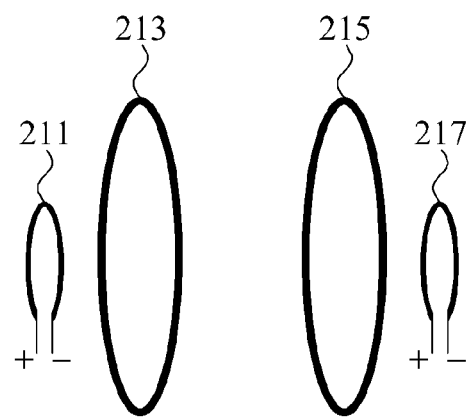
FIGS. 2A through 2D are diagrams illustrating feeding and impedance matching in a wireless power transmission scheme.
Figure 2B:
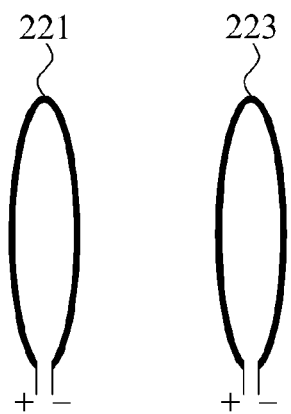
Figure 2C:
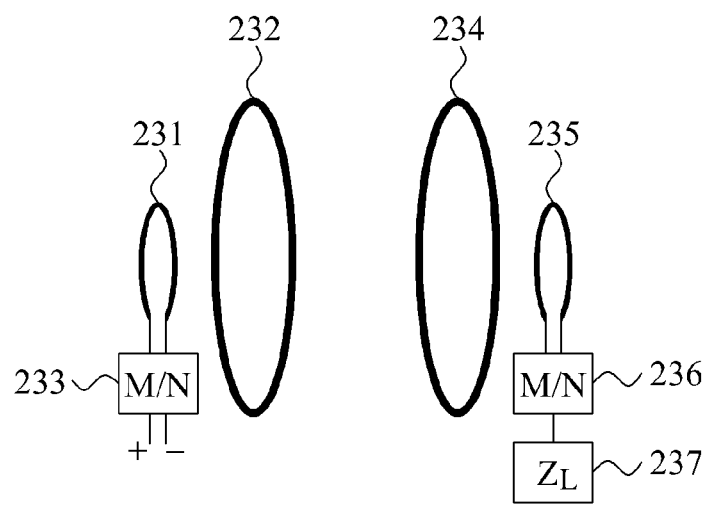
Figure 2D:
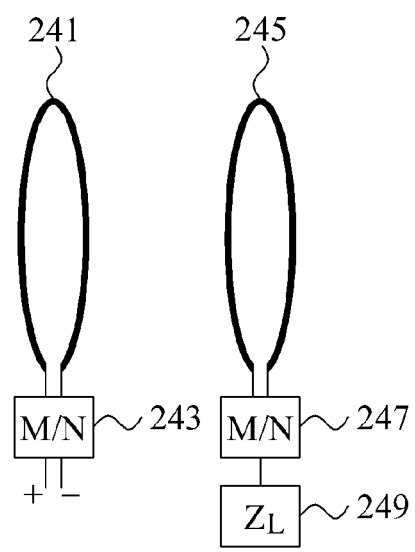

FIGS. 2A and 2C illustrate power supplied to a resonator through a separate feeder. FIGS. 2B and 2D illustrate power supplied to a resonator directly, without a separate feeder.

Referring to FIG. 2A, in a source device, a feeder 211 may supply power to a source resonator 213. In a target device, a target resonator 215 may transfer power to a feeder 217. For example, when the feeder 211 is located outside the source resonator 213 as described above, an induced current may be generated in the source resonator 213 due to an input current flowing in the feeder 211 in accordance with the Faraday's law. Impedance matching may be performed by controlling an input impedance by adjusting the size of the feeder 211 and the distance between the feeder 211 and the source resonator 213. The input impedance refers to an impedance viewed from the source resonator 213 to the target resonator 215.

Referring to FIG. 2B, a power may be supplied directly to a source resonator 221, in response to an RF signal. A target resonator 223 may directly transfer a power to a load.

Referring to FIG. 2C, a feeder 231 may supply power to a source resonator 232, in a similar manner to FIG. 2A. In a target device, a target resonator 234 may transfer power to a feeder 235. Additionally, a matching network 233 may be connected to the feeder 231, and a matching network 236 and a load 237 may be connected to the feeder 235. The matching network 233 may perform impedance matching between an input impedance and an output impedance that are viewed from the matching network 233. The impedance matching may also be performed by the feeder 231 and accordingly, the configuration of the matching network 233 may be simplified. The matching network 236 may perform impedance matching between the load 237, and an output impedance viewed from the matching network 236.

Referring to FIG. 2D, a matching network 243 may be connected to a source resonator 241, and a matching network 247 and a load 249 may be connected to a target resonator 245. For example, when power is supplied directly to the source resonator 241, the matching network 243 may be separately required to perform impedance matching between an input impedance and an output impedance. Additionally, the matching network 247 may be separately required to perform impedance matching between the load 249 and an output impedance. The input impedance may be changed based on a distance between the source resonator 241 and the target resonator 245, a charging state of the load 249, and the like. To perform impedance matching for various changes in the input impedance, the matching network 243 having a complex structure may be required.

Figure 3A:
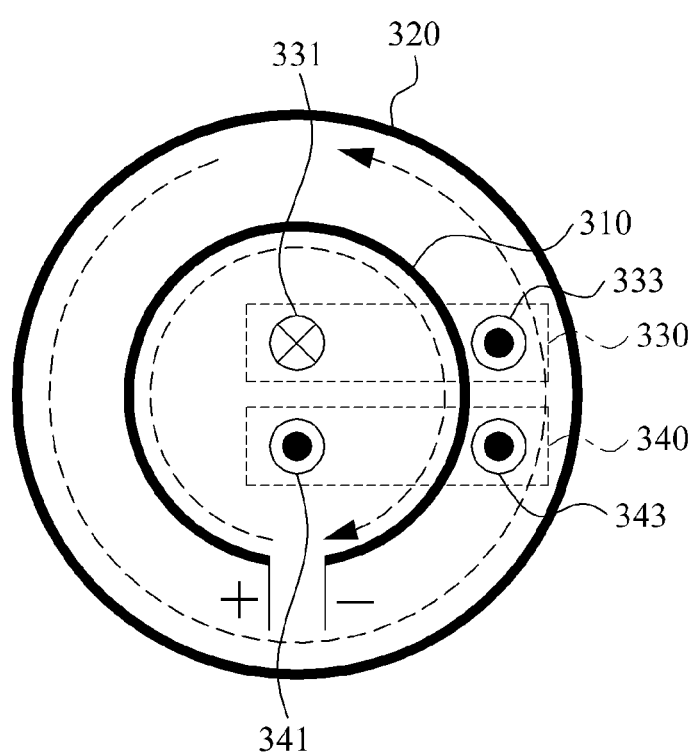

FIGS. 3A and 3B illustrate a distribution of a magnetic field in a feeder and a source resonator.

When a source resonator receives power supply through a separate feeder, magnetic fields may be formed in both the feeder and the source resonator.

Referring to FIG. 3A, as an input current flows in a feeder 310, a magnetic field 330 may be formed. A direction 331 of the magnetic field 330 within the feeder 310 may have a phase opposite to a phase of a direction 333 of the magnetic field 330 outside the feeder 310. The magnetic field 330 formed by the feeder 310 may cause an induced current to be formed in a source resonator 320. The direction of the induced current may be opposite to a direction of the input current.

Due to the induced current, a magnetic field 340 may be formed in the source resonator 320. Directions of a magnetic field formed due to an induced current in all positions of the source resonator 320 may be identical. Accordingly, a direction 341 of the magnetic field 340 formed by the source resonator 320 may have the same phase as a direction 343 of the magnetic field 340 formed by the source resonator 320.

Consequently, when the magnetic field 330 formed by the feeder 310 and the magnetic field 340 formed by the source resonator 320 are combined, the strength of the total magnetic field may decrease within the feeder 310, but may increase outside the feeder 310. When power is supplied to the source resonator 320 through the feeder 310 configured as illustrated in FIG. 3, the strength of the total magnetic field may decrease in the center of the source resonator 320, but may increase in outer edges of the source resonator 320. When a magnetic field is randomly distributed in the source resonator 320, it may be difficult to perform impedance matching, since an input impedance may frequently vary. Additionally, when the strength of the total magnetic field is increased, the efficiency of wireless power transmission may be increased. Conversely, when the strength of the total magnetic field is decreased, the efficiency for wireless power transmission may be reduced. Accordingly, the power transmission efficiency may be reduced on average.

FIG. 3A illustrates the magnetic field distribution in one target resonator. Current flowing in the source resonator 320 may be induced by the input current flowing in the feeder 310. And current flowing in the target resonator may be induced by a magnetic coupling between the source resonator 320 and the target resonator. The current flowing in the target resonator may cause a magnetic field to be formed so that an induced current may be generated in a feeder located in the target resonator. Within the feeder, a direction of a magnetic field formed by the target resonator may have a phase opposite to a phase of a direction of a magnetic field formed by the feeder and accordingly, the strength of the total magnetic field may be reduced.

FIG. 3B illustrates one wireless power transmitter in which a source resonator 350 and a feeder 360 have a common ground. The source resonator 350 may include a capacitor 351. The feeder 360 may receive an input of an RF signal via a port 361.

For example, when the RF signal is received to the feeder 360, an input current may be generated in the feeder 360. The input current flowing in the feeder 360 may cause a magnetic field to be formed, and current may be induced in the source resonator 350 by the magnetic field. Additionally, another magnetic field may be formed due to the induced current flowing in the source resonator 350. A direction of the input current flowing in the feeder 360 may have a phase opposite to a phase of a direction of the induced current flowing in the source resonator 350. Accordingly, in a region between the source resonator 350 and the feeder 360, a direction 371 of the magnetic field formed due to the input current may have the same phase as a direction 373 of the magnetic field formed due to the induced current, and thus the strength of the total magnetic field may increase. Conversely, within the feeder 360, a direction 381 of the magnetic field formed due to the input current may have a phase opposite to a phase of a direction 383 of the magnetic field formed due to the induced current, and thus the strength of the total magnetic field may decrease. Therefore, the strength of the total magnetic field may decrease in the center of the source resonator 350, but may increase in outer edges of the source resonator 350.

The feeder 360 may determine an input impedance by adjusting an internal area of the feeder 360. The input impedance refers to an impedance viewed in a direction from the feeder 360 to the source resonator 350. When the internal area of the feeder 360 is increased, the input impedance may be increased. Conversely, when the internal area of the feeder 360 is reduced, the input impedance may be reduced. Since the magnetic field is randomly distributed in the source resonator 350 despite a reduction in the input impedance, a value of the input impedance may vary depending on a location of a target device. Accordingly, a separate matching network may be required to match the input impedance to an output impedance of a power amplifier. For example, when the input impedance is increased, a separate matching network may be used to match the increased input impedance to a relatively low output impedance, in some instances.

If the target resonator has the same configuration as the source resonator 350, and when a feeder of the target resonator has the same configuration as the feeder 360, a separate matching network may be required, because the direction of the current flowing in the target resonator has a phase opposite to the phase of induced current flowing in a direction in the feeder of the target resonator.

Figure 4A:
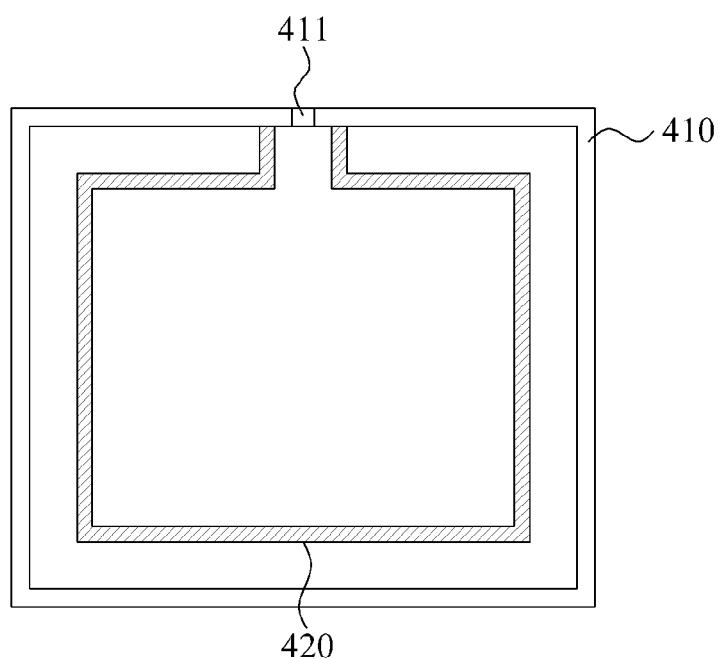
FIGS. 4A and 4B are diagrams illustrating a wireless power transmitter.

FIG. 4A illustrates a wireless power transmitter.

Referring to FIG. 4A, the wireless power transmitter may include a source resonator 410, and a feeding unit 420. The source resonator 410 may include a capacitor 411. The feeding unit 420 may be electrically connected to both ends of the capacitor 411.

Figure 4B:
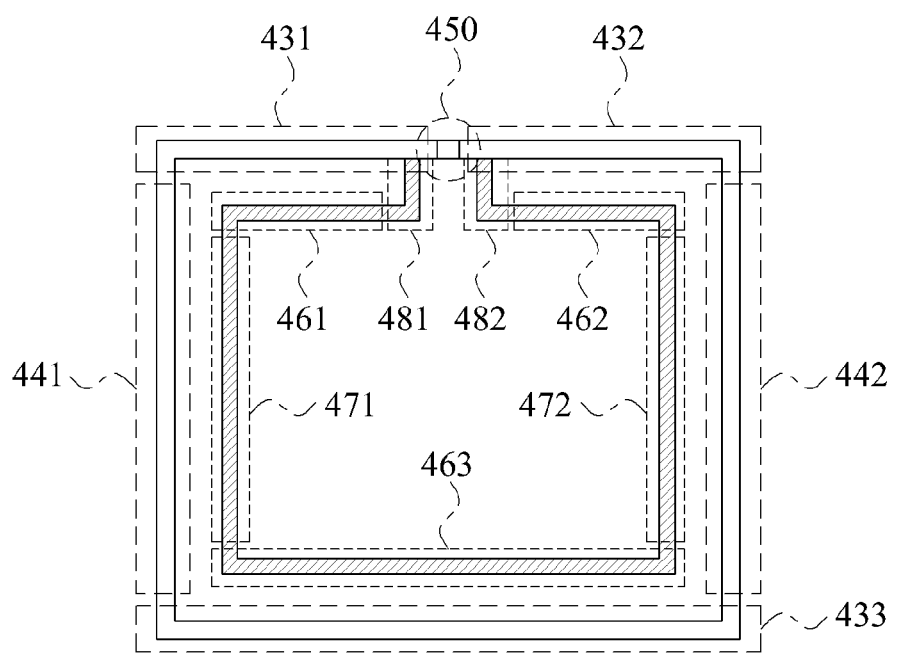

FIG. 4B illustrates, in more detail, the structure of the wireless power transmitter of FIG. 4A. The source resonator 410 may include a first transmission line, a first conductor 441, a second conductor 442, and at least one first capacitor 450.

The first capacitor 450 may be inserted or otherwise positioned in series between a first signal conducting portion 431 and a second signal conducting portion 432 in the first transmission line, and an electric field may be confined within the first capacitor 450. For example, the first transmission line may include at least one conductor in an upper portion of the first transmission line, and may also include at least one conductor in a lower portion of the first transmission line. Current may flow through the at least one conductor disposed in the upper portion of the first transmission line, and the at least one conductor disposed in the lower portion of the first transmission line may be electrically grounded. For example, a conductor disposed in an upper portion of the first transmission line may be separated into and thereby be referred to as the first signal conducting portion 431 and the second signal conducting portion 432. A conductor disposed in a lower portion of the first transmission line may be referred to as a first ground conducting portion 433.

As illustrate in FIG. 4B, the source resonator 410 may have a two-dimensional (2D) structure. The first transmission line may include the first signal conducting portion 431 and the second signal conducting portion 432 in the upper portion of the first transmission line. In addition, the first transmission line may include the first ground conducting portion 433 in the lower portion of the first transmission line. The first signal conducting portion 431 and the second signal conducting portion 432 may be disposed to face the first ground conducting portion 433. The current may flow through the first signal conducting portion 431 and the second signal conducting portion 432.

Additionally, one end of the first signal conducting portion 431 may be electrically connected (i.e., shorted) to the first conductor 441, and another end of the first signal conducting portion 431 may be connected to the first capacitor 450. One end of the second signal conducting portion 432 may be shorted to the second conductor 442, and another end of the second signal conducting portion 432 may be connected to the first capacitor 450. Accordingly, the first signal conducting portion 431, the second signal conducting portion 432, the first ground conducting portion 433, and the conductors 441 and 442 may be connected to each other, so that the source resonator 410 may have an electrically closed-loop structure. The term "closed-loop structure" as used herein, may include a polygonal structure, for example, a circular structure, a rectangular structure, or the like that is electrically closed.

The first capacitor 450 may be inserted into an intermediate portion of the first transmission line. For example, the first capacitor 450 may be inserted into a space between the first signal conducting portion 431 and the second signal conducting portion 432. The first capacitor 450 may have a shape of a lumped element, a distributed element, and the like. For example, a capacitor configured as a distributed element may include zigzagged conductor lines and a dielectric material that has a high permittivity positioned between the zigzagged conductor lines.

When the first capacitor 450 is instead into the first transmission line, the source resonator 410 may have a characteristic of a metamaterial. The metamaterial indicates a material having a predetermined electrical property that has not been discovered in nature, and thus, may have an artificially designed structure. An electromagnetic characteristic of the materials existing in nature may have a unique magnetic permeability or a unique permittivity. Most materials may have a positive magnetic permeability or a positive permittivity.

In the case of most materials, a right hand rule may be applied to an electric field, a magnetic field, and a pointing vector, and thus, the corresponding materials may be referred to as right handed materials (RHMs). However, the metamaterial that has a magnetic permeability or a permittivity absent in nature may be classified into an epsilon negative (ENG) material, a mu negative (MNG) material, a double negative (DNG) material, a negative refractive index (NRI) material, a left-handed (LH) material, and the like, based on the sign of the corresponding permittivity or magnetic permeability.

When the capacitance of the first capacitor 450 inserted as the lumped element is appropriately determined, the source resonator 410 may have the characteristic of the metamaterial. The source resonator 410 may have a negative magnetic permeability by appropriately adjusting the capacitance of the first capacitor 450. If so, the source resonator 410 may also be referred to as an MNG resonator. Various criteria may be applied to determine the capacitance of the first capacitor 450. For example, the various criteria for enabling the source resonator 410 to have the characteristic of the metamaterial may include one or more of the following: a criterion for enabling the source resonator 410 to have a negative magnetic permeability in a target frequency, a criterion for enabling the source resonator 410 to have a zeroth order resonance characteristic in the target frequency, or the like. Based on at least one criterion among the aforementioned criteria, the capacitance of the first capacitor 450 may be determined.

The source resonator 410, also referred to as the MNG resonator 410, may have a zeroth order resonance characteristic (i.e., having, as a resonant frequency, a frequency when a propagation constant is "0"). Because the source resonator 410 may have a zeroth order resonance characteristic, the resonant frequency may be independent with respect to a physical size of the MNG resonator 410. Moreover, by appropriately designing the first capacitor 450, the MNG resonator 410 may sufficiently change the resonant frequency without substantially changing the physical size of the MNG resonator 410.

In a near field, for instance, the electric field may be concentrated on the first capacitor 450 inserted into the first transmission line. Accordingly, due to the first capacitor 450, the magnetic field may become dominant in the near field. In one or more embodiments, the MNG resonator 410 may have a relatively high Q-factor using the first capacitor 450 of the lumped element. Thus, it may be possible to enhance the power transmission efficiency. For example, the Q-factor may indicate a level of an ohmic loss or a ratio of a reactance with respect to a resistance in the wireless power transmission. The efficiency of the wireless power transmission may increase according to an increase in the Q-factor.

In one or more embodiments, a magnetic core may be further provided to pass through the MNG resonator 410. The magnetic core may increase the power transmission distance.

Referring to FIG. 4B, the feeding unit 420 may include a second transmission line, a third conductor 471, a fourth conductor 472, a fifth conductor 481, and a sixth conductor 482.

The second transmission line may include a third signal conducting portion 461 and a fourth signal conducting portion 462 in an upper portion of the second transmission line. In addition, the second transmission line may include a second ground conducting portion 463 in a lower portion of the second transmission line. The third signal conducting portion 461 and the fourth signal conducting portion 462 may be disposed to face the second ground conducting portion 463. Current may flow through the third signal conducting portion 461 and the fourth signal conducting portion 462.

Additionally, one end of the third signal conducting portion 461 may be shorted to the third conductor 471, and another end of the third signal conducting portion 461 may be connected to the fifth conductor 481. One end of the fourth signal conducting portion 462 may be shorted to the fourth conductor 472, and another end of the fourth signal conducting portion 462 may be connected to the sixth conductor 482. The fifth conductor 481 may be connected to the first signal conducting portion 431, and the sixth conductor 482 may be connected to the second signal conducting portion 432. The fifth conductor 481 and the sixth conductor 482 may be connected in parallel to both ends of the first capacitor 450. And the fifth conductor 481 and the sixth conductor 482 may be used as input ports to receive an input of an RF signal.

Accordingly, the third signal conducting portion 461, the fourth signal conducting portion 462, the second ground conducting portion 463, the third conductor 471, the fourth conductor 472, the fifth conductor 481, the sixth conductor 482, and the source resonator 410 may be connected to each other, so that the source resonator 410 and the feeding unit 420 may have an electrically closed-loop structure. When an RF signal is received via the fifth conductor 481 or the sixth conductor 482, an input current may flow in the feeding unit 420 and the source resonator 410, a magnetic field may be formed due to the input current, and a current may be induced to the source resonator 410 by the formed magnetic field. A direction of the input current flowing in the feeding unit 420 may be identical to a direction of the induced current flowing in the source resonator 410 and thus, strength of the total magnetic field may increase in the center of the source resonator 410, but may decrease in outer edges of the source resonator 410. The direction of the input current, and the direction of the induced current will be further described with reference to FIGS. 5A and 5B.

An input impedance may be determined based on an area of a region between the source resonator 410 and the feeding unit 420 and accordingly, a separate matching network used to match the input impedance to an output impedance of a power amplifier may not be required. For example, if the matching network is used, the input impedance may be determined by adjusting a size of the feeding unit 420 and thus, a structure of the matching network may be simplified. The simplified structure of the matching network may minimize a matching loss of the matching network.

The second transmission line, the third conductor 471, the fourth conductor 472, the fifth conductor 481, and the sixth conductor 482 may form the same structure as the source resonator 410. If the source resonator 410 has a loop structure, the feeding unit 420 may also have a loop structure. Alternatively, if the source resonator 410 has a circular structure, the feeding unit 420 may also have a circular structure.

The above-described configuration of the source resonator 410 and configuration of the feeding unit 420 may equally be applied to the target resonator and the feeding unit of the target resonator, respectively. When the feeding unit of the target resonator is configured as described above, the feeding unit may match an output impedance of the target resonator and an input impedance of the feeding unit, by adjusting a size of the feeding unit. Accordingly, a separate matching network may not be used.

Figure 5A:
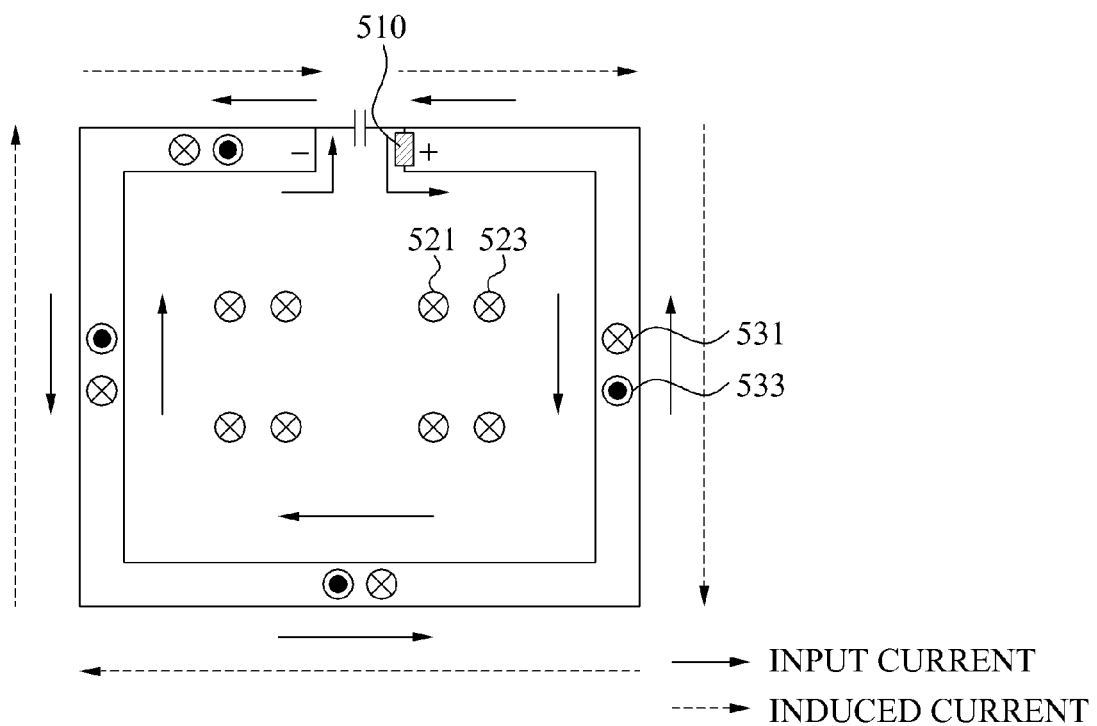
FIG. 5A is a diagram illustrating a distribution of a magnetic field within a source resonator based on feeding of a feeding unit.
Figure 5B:
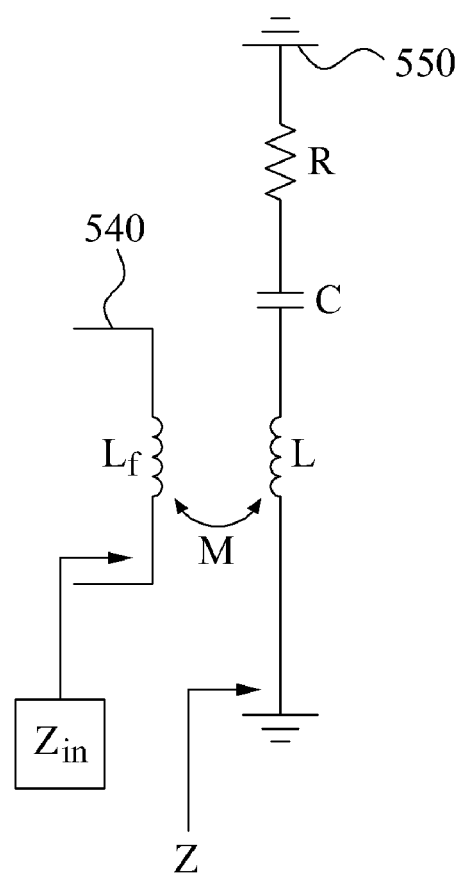
FIG. 5B is a diagram illustrating equivalent circuits of a feeding unit and a source resonator.

FIG. 5A illustrates a distribution of a magnetic field within a source resonator based on feeding of a feeding unit. Specifically, FIG. 5A more briefly illustrates the source resonator 410 and the feeding unit 420 of FIG. 4A. FIG. 5B illustrates one equivalent circuit of a feeding unit 540, and one equivalent circuit of a source resonator 550.

A feeding operation may refer to supplying a power to a source resonator in a wireless power transmitter, or refer to supplying AC power to a rectification unit in a wireless power receiver. FIG. 5A illustrates a direction of an input current flowing in the feeding unit, and a direction of an induced current induced in the source resonator. Additionally, FIG. 5A illustrates a direction of a magnetic field formed due to the input current of the feeding unit, and a direction of a magnetic field formed due to the induced current of the source resonator.

Referring to FIG. 5A, a fifth conductor or a sixth conductor of the feeding unit may be used as an input port 510. The input port 510 may receive an input of an RF signal. The RF signal may be output from a power amplifier. The power amplifier may increase or decrease the amplitude of the RF signal, on demand by a target device. The RF signal received by the input port 510 may be displayed in the form of an input current flowing in the feeding unit. The input current may flow in a clockwise direction in the feeding unit, along a transmission line of the feeding unit. The fifth conductor of the feeding unit may be electrically connected to the source resonator. More specifically, the fifth conductor may be connected to a first signal conducting portion of the source resonator. Accordingly, the input current may flow in the source resonator, as well as, in the feeding unit. The input current may flow in a counterclockwise direction in the source resonator. The input current flowing in the source resonator may cause a magnetic field to be formed so that an induced current may be generated in the source resonator due to the magnetic field. The induced current may flow in a clockwise direction in the source resonator. The induced current may transfer energy to a capacitor of the source resonator, and a magnetic field may be formed due to the induced current. The input current flowing in the feeding unit and the source resonator may be indicated by a solid line of FIG. 5A, and the induced current flowing in the source resonator may be indicated by a dotted line of FIG. 5A.

A direction of a magnetic field formed due to current may be determined based on the right hand rule. As illustrated in FIG. 5A, within the feeding unit, a direction 521 of a magnetic field formed due to the input current flowing in the feeding unit may be identical to a direction 523 of a magnetic field formed due to the induced current flowing in the source resonator. Accordingly, the strength of the total magnetic field may increase within the feeding unit.

Additionally, in a region between the feeding unit and the source resonator, a direction 533 of a magnetic field formed due to the input current flowing in the feeding unit has a phase opposite to a phase of a direction 531 of a magnetic field formed due to the induced current flowing in the source resonator, as illustrated in FIG. 5A. Accordingly, the strength of the total magnetic field may decrease in the region between the feeding unit and the source resonator.

Typically, the strength of a magnetic field decreases in the center of a source resonator with the loop structure, and increases in outer edges of the source resonator. However, referring to FIG. 5A, the feeding unit may be electrically connected to both ends of a capacitor of the source resonator, and accordingly the induced current of the source resonator may flow in the same direction as the input current of the feeding unit. Since the induced current of the source resonator flows in the same direction as the input current of the feeding unit, the strength of the total magnetic field may increase within the feeding unit, and may decrease outside the feeding unit. As a result, the strength of the total magnetic field may increase in the center of the source resonator with the loop structure, and may decrease in the outer edges of the source resonator, due to the feeding unit. Thus, the strength of the total magnetic field may be equalized within the source resonator. Additionally, the power transmission efficiency for transferring power from the source resonator to a target resonator may be in proportion to the strength of the total magnetic field formed in the source resonator. When the strength of the total magnetic field increases in the center of the source resonator, the power transmission efficiency may also increase.

Referring to FIG. 5B, the feeding unit 540 and the source resonator 550 may be expressed by the equivalent circuits. An input impedance $Z_{in}$, viewed in a direction from the feeding unit 540 to the source resonator 550 may be computed, as given in Equation 1.

$$Z_{in} = \frac{(\omega M)^2}{Z} \qquad \text{[Equation 1]}$$

In Equation 1, M denotes a mutual inductance between the feeding unit 540 and the source resonator 550, $\omega$ denotes a resonant frequency between the feeding unit 540 and the source resonator 550, and Z denotes an impedance viewed in a direction from the source resonator 550 to a target device. The input impedance $Z_{in}$, may be in proportion to the mutual inductance M. Accordingly, the input impedance $Z_{in}$, may be controlled by adjusting the mutual inductance M. The mutual inductance M may be adjusted based on an area of a region between the feeding unit 540 and the source resonator 550. The area of the region between the feeding unit 540 and the source resonator 550 may be adjusted based on the size of the feeding unit 540. The input impedance $Z_{in}$, may be determined based on the size of the feeding unit 540, and thus a separate matching network may not be required to perform impedance matching with an output impedance of a power amplifier.

For a target resonator and a feeding unit included in a wireless power receiver, a magnetic field may be distributed as illustrated in FIG. 5A. For example, the target resonator may receive a wireless power from a source resonator, using magnetic coupling. Due to the received wireless power, an induced current may be generated in the target resonator. A magnetic field formed due to the induced current in the target resonator may cause another induced current to be generated in the feeding unit. If the target resonator is connected to the feeding unit as illustrated in FIG. 5A, the induced current generated in the target resonator may flow in the same direction as the induced current generated in the feeding unit. Thus, the strength of the total magnetic field may increase within the feeding unit, but may decrease in a region between the feeding unit and the target resonator.

Figure 6:
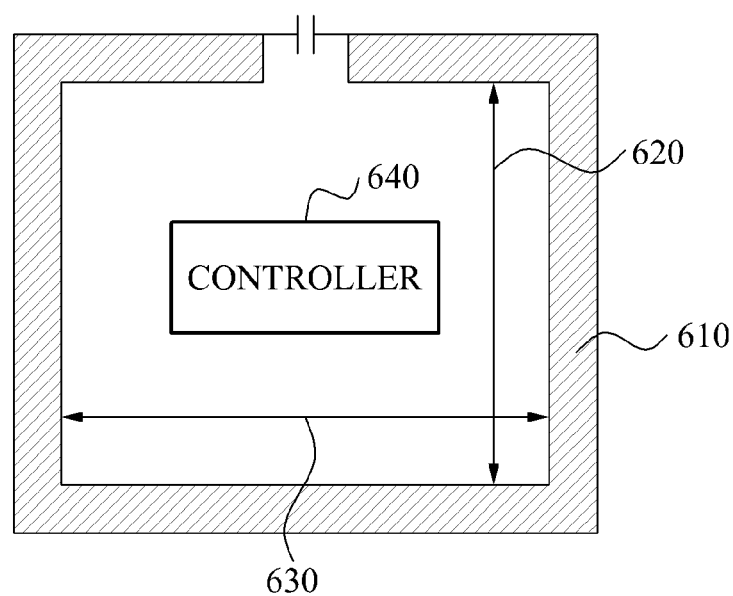
FIG. 6 is a diagram illustrating another wireless power transmitter.

FIG. 6 illustrates another wireless power transmitter.

Referring to FIG. 6, a controller 640 may adjust a mutual inductance M between the feeding unit and the source resonator by adjusting an area of a region 610 between a feeding unit and a source resonator. By adjusting the mutual inductance M, the controller 640 may determine a value of an input impedance $Z_{in}$. The area of the region 610 may be adjusted by controlling the size of the feeding unit. The size of the feeding unit may be determined based on a distance 620 between a fourth signal conducting portion and a second ground conducting portion, and/or based on a distance 630 between a third conductor and a fourth conductor.

When the area of the region 610 is increased, the mutual inductance M may be increased. Conversely, when area of the region 610 is reduced, the mutual inductance M may be reduced. The controller 640 may determine the value of the input impedance $Z_{in}$, by adjusting the size of the feeding unit. For example, the value of the input impedance $Z_{in}$ may be adjusted from about 1 ohm (Ω) to 3000Ω, based on the size of the feeding unit. Accordingly, the controller 640 may match the input impedance $Z_{in}$ to an output impedance of a power amplifier, based on the size of the feeding unit. The controller 640 may not need to employ a separate matching network to perform impedance matching between the input impedance $Z_{in}$ and the output impedance of the power amplifier. For example, when the output impedance of the power amplifier has a value of 50Ω, the controller 640 may adjust the input impedance $Z_{in}$ to 50Ω, by adjusting the size of the feeding unit. Additionally, if a matching network is used for an efficiency of matching, the controller 640 may minimize the loss of power transmission efficiency by simplifying a structure of the matching network.

The controller 640 may control a magnetic field formed in the source resonator to be uniformly distributed based on a direction of an induced current flowing in the source resonator, and a direction of an input current flowing in the feeding unit. Since the feeding unit and the source resonator are electrically connected to both ends of a capacitor, the induced current may be flow in the source resonator in the same direction as the input current. The controller 640 may be configured to adjust the size of the feeding unit based on distribution of the magnetic field in the source resonator, to strengthen a portion of the magnetic field with a low strength, or to weaken a portion of the magnetic field with a high strength, so that the magnetic field may be uniformly distributed. This is because the controller 640 may enable strength of the total magnetic field to increase within the feeding unit, and enable the strength of the magnetic field to decrease in the region 610 between the feeding unit and the source resonator.

When the magnetic field is uniformly distributed in the source resonator, the source resonator may have a constant input impedance value. Due to the constant input impedance value, the wireless power transmitter may prevent the power transmission efficiency from being reduced, and may effectively transmit power to the target device, regardless of a location of the target device on the source resonator.

A wireless power receiver may also include a target resonator, a feeding unit, and a controller. The controller may be configured to control an output impedance of the target resonator by adjusting the size of the feeding unit. The controller may match the output impedance of the target resonator to an input impedance of the feeding unit by adjusting an area of a region between the target resonator and the feeding unit. The output impedance of the target resonator may refer to an impedance viewed in a direction from the target resonator to the source resonator. The input impedance of the feeding unit may refer to an impedance viewed in a direction from the feeding unit to a load.

Figure 7:
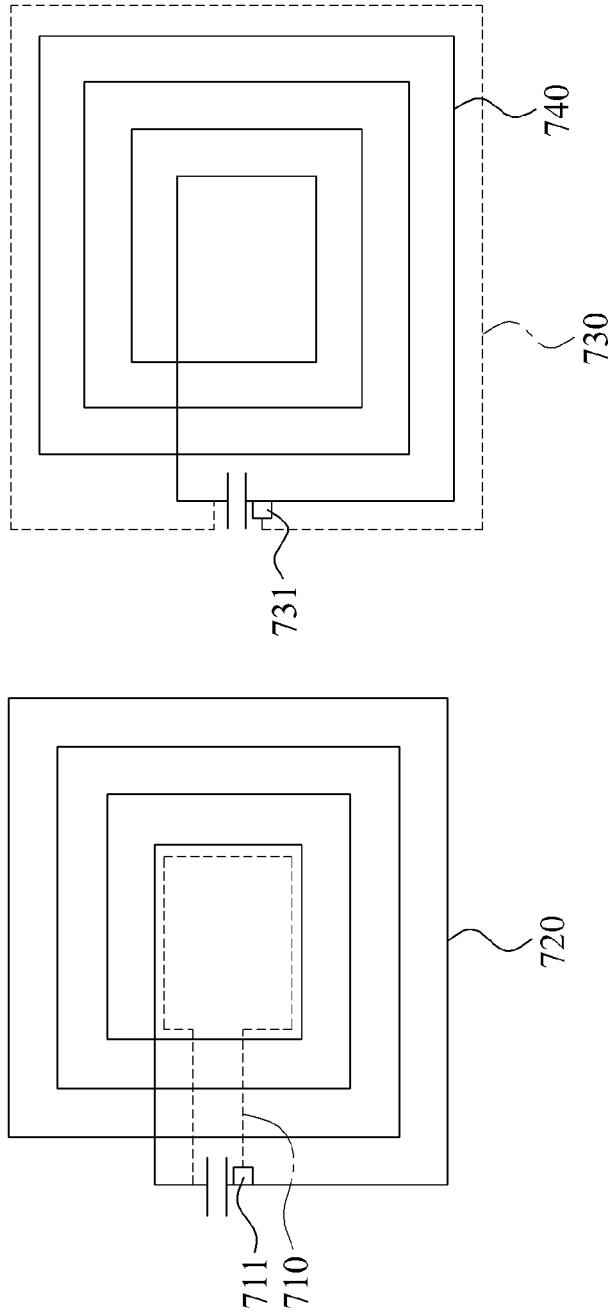
FIG. 7 is a diagram illustrating still another wireless power transmitter.

FIG. 7 illustrates still another wireless power transmitter.

Referring to FIG. 7, source resonators 720 and 740 are implemented as spiral resonators. The spiral resonators may be configured by winding a coil one or more times in a spiral shape.

In FIG. 7, a feeding unit 710 may be disposed in the source resonator 720, in particular, in an innermost turn of the coil wound in the spiral shape. The feeding unit 710 may include an input port 711. The input port 711 may receive an input of an RF signal, and may enable an input current to flow in the feeding unit 710. The input current may also flow in the source resonator 720, and may cause a magnetic field to be formed. Additionally, the magnetic field may enable an induced current to be generated in the source resonator 720 in the same direction as the input current.

The source resonators 720 and 740 may also include a capacitor. The capacitor may be electrically connected between a winding starting end of the coil and a winding finishing end of the coil.

Additionally, a feeding unit 730 may be disposed around the source resonator 740, in particular, outside an outermost turn of the coil wound in the spiral shape. The feeding unit 730 may include an input port 731. The input port 731 may receive an input of an RF signal, and may enable an input current to flow in the feeding unit 730. The input current may also flow in the source resonator 740, and may cause a magnetic field to be formed. Additionally, the magnetic field may enable an induced current to be generated in the source resonator 740 in the same direction as the input current.

A source resonator may be, for example, a meta-resonator, a coil resonator, a spiral resonator, a helical resonator, or the like. Additionally, a feeding unit enabling induced current to be generated in the source resonator may be located within or outside the source resonator. The feeding unit may be electrically connected to both ends of a capacitor included in the source resonator. Portions of the feeding unit that are electrically connected to both ends of the capacitor may not enable an input current to pass directly through the capacitor. The input current may flow through a loop formed by the feeding unit and the source resonator.

FIGS. 8A through 13B illustrate various resonator structures. A source resonator included in a wireless power transmitter, and a target resonator included in a wireless power receiver may be configured as illustrated in FIGS. 8A through 13B.

Figure 8B:
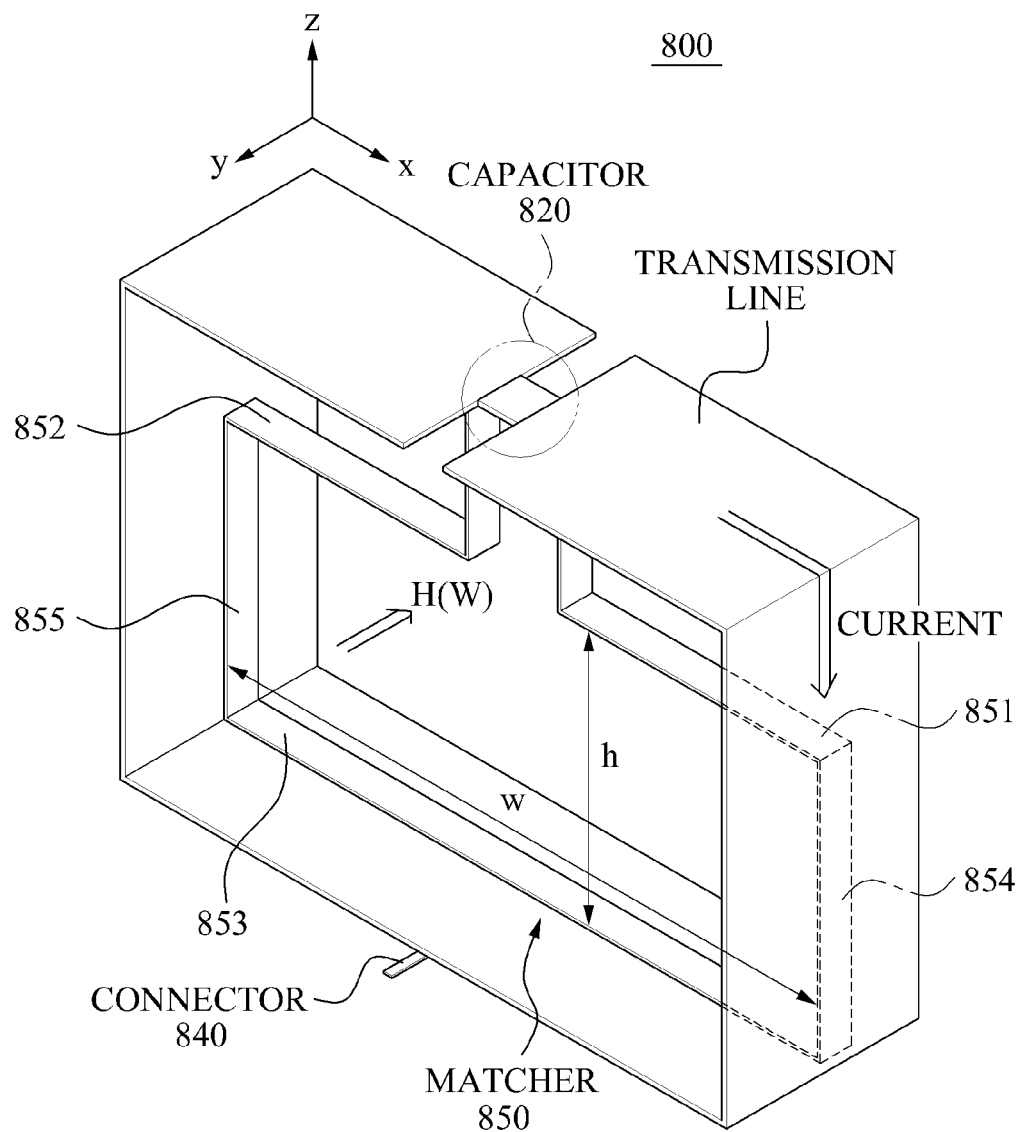
FIGS. 8A through 13B are diagrams illustrating various resonator structures.

FIGS. 8A and 8B illustrate a resonator having a three-dimensional (3D) structure.

Referring to FIG. 8A, a resonator 800 having the 3D structure may include a transmission line and a capacitor 820. The transmission line may include a first signal conducting portion 811, a second signal conducting portion 812, and a ground conducting portion 813. The capacitor 820 may be inserted in series between the first signal conducting portion 811 and the second signal conducting portion 812 of the transmission line such that an electric field may be confined within the capacitor 820.

As illustrated in FIG. 8A, the resonator 800 may have a generally 3D structure. The transmission line may include the first signal conducting portion 811 and the second signal conducting portion 812 in an upper portion of the resonator 800, and may include the ground conducting portion 813 in a lower portion of the resonator 800. The first signal conducting portion 811 and the second signal conducting portion 812 may be disposed to face the ground conducting portion 813. In this arrangement, current may flow in an x direction through the first signal conducting portion 811 and the second signal conducting portion 812. Due to the current, a magnetic field H(W) may be formed in a −y direction. Alternatively, the magnetic field H(W) might also be formed in the opposite direction (e.g., a +y direction) in some implementations.

In one or more embodiments, one end of the first signal conducting portion 811 may be shorted to a conductor 842, and another end of the first signal conducting portion 811 may be connected to the capacitor 820. One end of the second signal conducting portion 812 may be shorted to a conductor 841, and another end of the second signal conducting portion 812 may be connected to the capacitor 820. Accordingly, the first signal conducting portion 811, the second signal conducting portion 812, the ground conducting portion 813, and the conductors 841 and 842 may be connected to each other, whereby the resonator 800 may have an electrically closed-loop structure.

As illustrated in FIG. 8A, the capacitor 820 may be inserted or otherwise positioned between the first signal conducting portion 811 and the second signal conducting portion 812. The capacitor 820 may be configured as a lumped element, a distributed element, or the like. In particular, a distributed capacitor configured as a distributed element may include zigzagged conductor lines and a dielectric material having a relatively high permittivity positioned between the zigzagged conductor lines.

When the capacitor 820 is inserted into the transmission line, the resonator 800 may have a characteristic of a metamaterial.

The resonator 800 may have the characteristic of the metamaterial, in some instance, due to the capacitance of the capacitor inserted as the lumped element. Since the resonator 800 may have a negative magnetic permeability by appropriately adjusting the capacitance of the capacitor 820, the resonator 800 may also be referred to as an MNG resonator. Various criteria may be applied to determine the capacitance of the capacitor 820. For example, the various criteria may include one or more of the following: a criterion for enabling the resonator 800 to have the characteristic of the metamaterial, a criterion for enabling the resonator 800 to have a negative magnetic permeability in a target frequency, a criterion for enabling the resonator 800 to have a zeroth order resonance characteristic in the target frequency, or the like. The resonator 800, also referred to as the MNG resonator 800, may have a zeroth order resonance characteristic of having, as a resonant frequency, a frequency when a propagation constant is "0". If the resonator 800 has a zeroth order resonance characteristic, the resonant frequency may be independent with respect to a physical size of the MNG resonator 800. Thus, by appropriately designing or configuring the capacitor 820, the MNG resonator 800 may sufficiently change the resonant frequency without substantially changing the physical size of the MNG resonator 800.

Referring to the MNG resonator 800 of FIG. 8A, in a near field, the electric field may be concentrated on the capacitor 820 inserted into the transmission line. Accordingly, due to the capacitor 820, the magnetic field may become dominant in the near field. And since the MNG resonator 800 having the zeroth-order resonance characteristic may have characteristics similar to a magnetic dipole, the magnetic field may become dominant in the near field. A relatively small amount of the electric field formed due to the insertion of the capacitor 820 may be concentrated on the capacitor 820 and thus, the magnetic field may become further dominant. The MNG resonator 800 may have a relatively high Q-factor using the capacitor 820 of the lumped element and thus, it may be possible to enhance an efficiency of power transmission.

If the MNG resonator 800 includes a matcher 830 to be used in impedance matching, the matcher 830 may be configured to appropriately adjust the strength of the magnetic field of the MNG resonator 800. An impedance of the MNG resonator 800 may be determined by the matcher 830. Current may flow in the MNG resonator 800 via a connector 840, or may flow out from the MNG resonator 800 via the connector 840. The connector 840 may be connected to the ground conducting portion 813 or the matcher 830.

As illustrated in FIG. 8A, the matcher 830 may be positioned within the loop formed by the loop structure of the resonator 800. The matcher 830 may be configured to adjust the impedance of the resonator 800 by changing the physical shape of the matcher 830. For example, the matcher 830 may include a conductor 831 to be used in the impedance matching in a location separate from the ground conducting portion 813 by a distance h. The impedance of the resonator 800 may be changed by adjusting the distance h.

In one or more embodiments, a controller may be provided to control the matcher 830. The matcher 830 may change the physical shape of the matcher 830 based on a control signal generated by the controller. For example, the distance h between the conductor 831 of the matcher 830 and the ground conducting portion 813 may be increased or decreased based on the control signal. Accordingly, the physical shape of the matcher 830 may be changed such that the impedance of the resonator 800 may be adjusted. The distance h between the conductor 831 of the matcher 830 and the ground conducting portion 813 may be adjusted using a variety of schemes. For example, one or more conductors may be included in the matcher 830 and the distance h may be adjusted by adaptively activating one of the conductors. Alternatively or additionally, the distance h may be adjusted by adjusting the physical location of the conductor 831 up and down. For instance, the distance h may be controlled based on the control signal of the controller. The controller may generate the control signal using one or more factors.

As illustrated in FIG. 8A, the matcher 830 may be configured as a passive element such as the conductor 831. According to various embodiments, the matcher 830 may be configured as an active element such as, for example, a diode, a transistor, or the like. If an active element is included in the matcher 830, the active element may be driven based on the control signal generated by the controller, and the impedance of the resonator 800 may be adjusted based on the control signal. For example, if a diode is included in the matcher 830, the impedance of the resonator 800 may be adjusted depending on whether the diode is in an ON state or in an OFF state.

In one or more embodiments, a magnetic core may be further provided to pass through the resonator 800 configured as the MNG resonator 800. The magnetic core may increase the power transmission distance.

In some embodiments, the resonator 800 may include a matcher 850 for impedance matching, as illustrate in FIG. 8B. The matcher 850 may include a transmission line, and conductors 854 and 855. The transmission line may include a third signal conducting portion 851, a fourth signal conducting portion 852, and a ground conducting portion 853. The conductor 854 may connect the third signal conducting portion 851 and the ground conducting portion 853, and the conductor 855 may connect the fourth signal conducting portion 852 and the ground conducting portion 853. The third signal conducting portion 851 and the fourth signal conducting portion 852 may be connected to both ends of the capacitor 820 of the resonator 800.

Additionally, one end of the third signal conducting portion 851 may be shorted to the conductor 854, and another end of the third signal conducting portion 851 may be connected to one end of the capacitor 820. One end of the fourth signal conducting portion 852 may be shorted to the conductor 855, and another end of the fourth signal conducting portion 852 may be connected to another end of the capacitor 820.

Accordingly, the matcher 850 and the resonator 800 may be connected to each other, such that the resonator 800 may have an electrically closed-loop structure. The matcher 850 may appropriately adjust strength of a magnetic field in the resonator 800. An impedance of the resonator 800 may be determined by the matcher 850. Additionally, current may flow into and/or out of the resonator 800 via the connector 840. The connector 840 may be connected to the matcher 850. More specifically, the connector 840 may be connected to the third signal conducting portion 851 or the fourth signal conducting portion 852. The current flowing into the resonator 800 via the connector 840 may cause an induced current to be generated in the resonator 800. Accordingly, a direction of a magnetic field formed by the resonator 800 may be identical to a direction of a magnetic field formed by the matcher 850 and thus, the strength of the total magnetic field may increase within the matcher 850. Conversely, a direction of a magnetic field formed by the resonator 800 may be opposite to a direction of a magnetic field formed by the matcher 850 and thus, the strength of the total magnetic field may decrease outside the matcher 850.

The matcher 850 may be configured to adjust an impedance of the resonator 800 by changing the physical shape of the matcher 850. For example, the matcher 850 may include the third signal conducting portion 851 and the fourth signal conducting portion 852 for the impedance matching in a location that is separated from the ground conducting portion 853 by a distance h. The impedance of the resonator 800 may be changed by adjusting the distance h.

In one or more embodiments, a controller may be provided to control the matcher 850. For example, the matcher 850 may change the physical shape of the matcher 850 based on a control signal generated by the controller. For example, the distance h between the ground conducting portion 853, and the third signal conducting portion 851 and the fourth signal conducting portion 852 of the matcher 850 may increase or decrease based on the control signal. Accordingly, the physical shape of the matcher 850 may be changed, and the impedance of the resonator 800 may be adjusted. The distance h between the ground conducting portion 853, and the third signal conducting portion 851 and the fourth signal conducting portion 852 of the matcher 850 may be adjusted using a variety of schemes. In some instances, one or more conductors may be included in the matcher 850 and the distance h may be adjusted by adaptively activating one of the conductors. Also, the distance h may be adjusted by adjusting the physical locations of the third signal conducting portion 851 and the fourth signal conducting portion 852 up and down. The distance h may be controlled based on the control signal of the controller. The controller may generate the control signal using various factors. Additionally, a distance w between the conductors 854 and 855 of the matcher 850 may increase or decrease based on the control signal. Accordingly, the physical shape of the matcher 850 may be changed and the impedance of the resonator 800 may be adjusted.

Figure 9A:
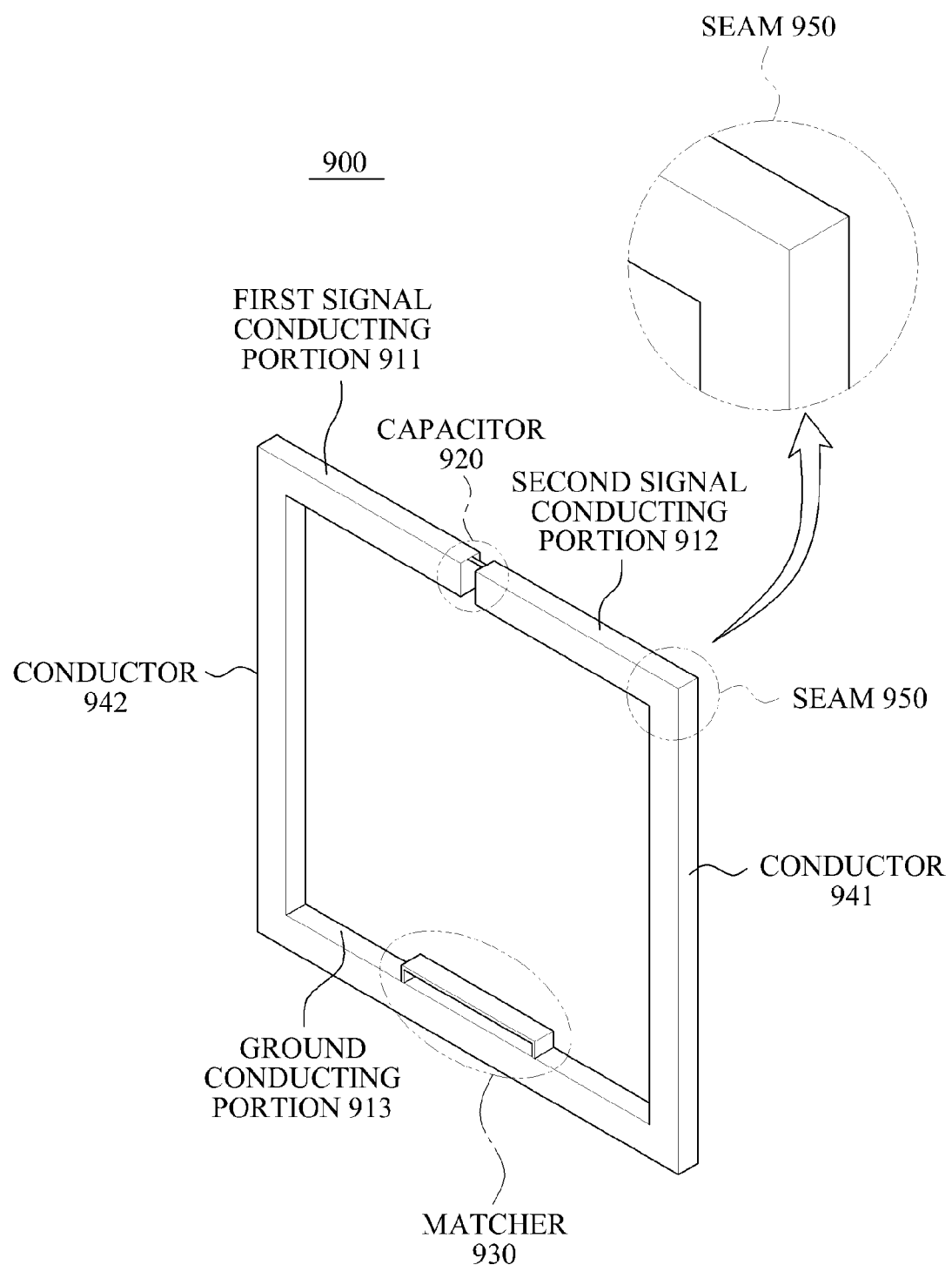
Figure 9B:
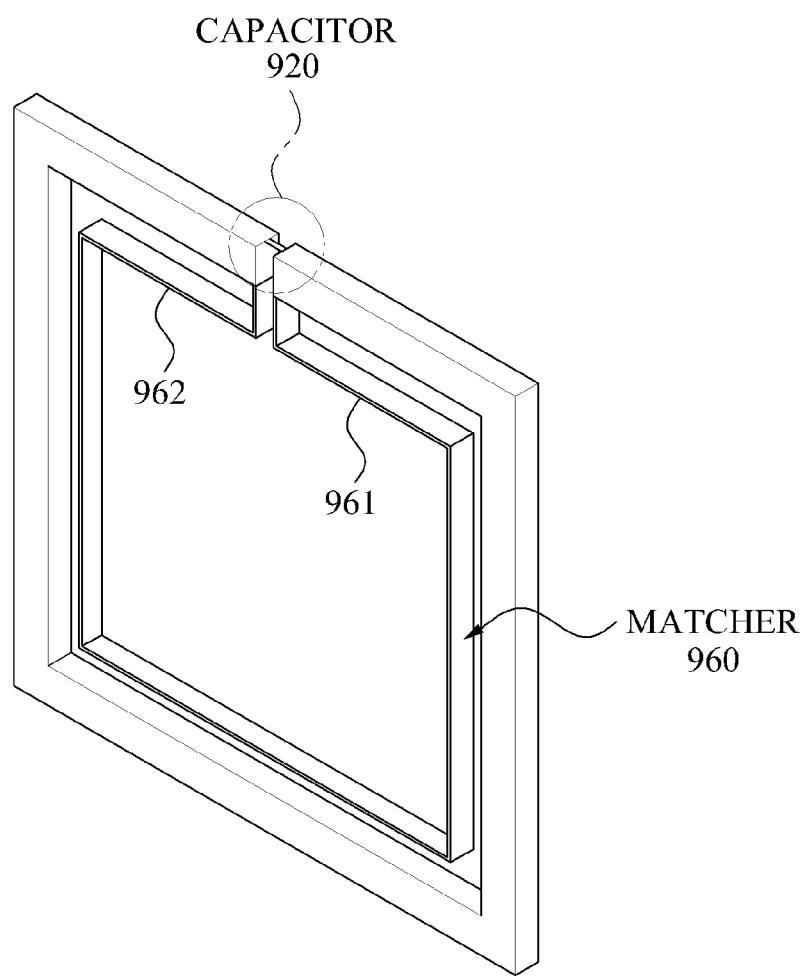

FIGS. 9A and 9B illustrate a bulky-type resonator for wireless power transmission. As used herein, the term "bulky type" may refer to a seamless connection connecting at least two parts in an integrated form.

Referring to FIG. 9A, a first signal conducting portion 911 and a conductor 942 may be integrally formed, rather than being separately manufactured and being connected to each other. Similarly, a second signal conducting portion 912 and a conductor 941 may also be integrally manufactured.

If the second signal conducting portion 912 and the conductor 941 are separately manufactured and then are connected to each other, a loss of conduction may occur due to a seam 950. Thus, is some implementations, the second signal conducting portion 912 and the conductor 941 may be connected to each other without using a separate seam (i.e., seamlessly connected to each other). Additionally, the conductor 941 and a ground conducting portion 913 may be seamlessly connected to each other. Accordingly, it may be possible to decrease conductor loss caused by the seam 950. For instance, the second signal conducting portion 912 and the ground conducting portion 913 may be seamlessly and integrally manufactured. Similarly, the first signal conducting portion 911 and the ground conducting portion 913 may be seamlessly and integrally manufactured.

As illustrated n FIG. 9A, a resonator 900 may include a matcher 930. Or as illustrated in FIG. 9B, the resonator 900 may include a matcher 960 in which conduction portions 961 and 962 of the matcher 960 are connected to the capacitor 920.

Figure 10A:
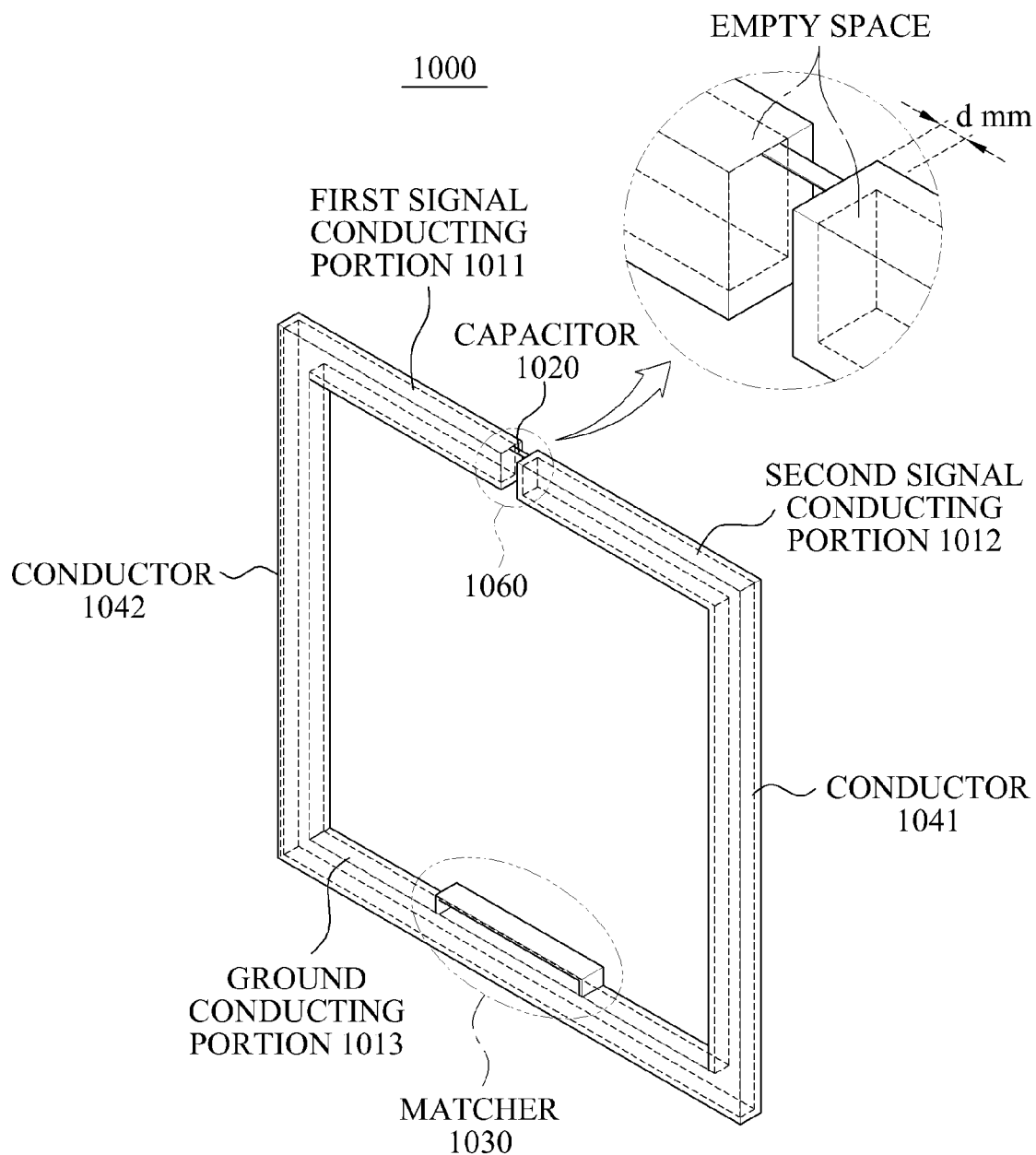
Figure 10B:
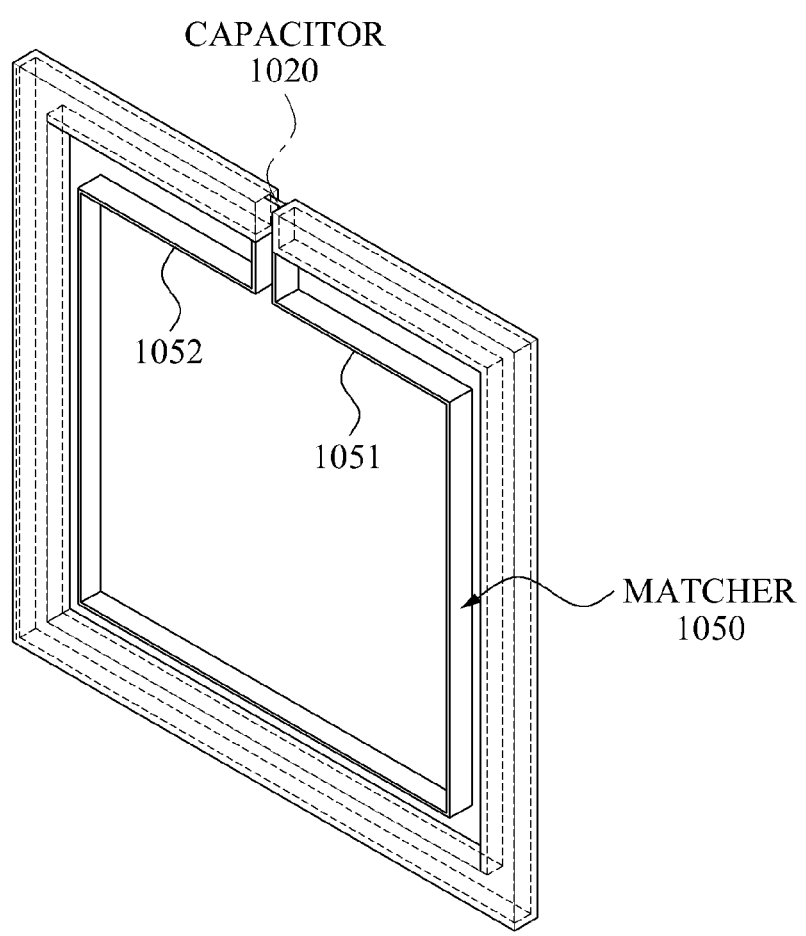

FIGS. 10A and 10B illustrate a hollow-type resonator for wireless power transmission.

Referring to FIG. 10A, one or more of a first signal conducting portion 1011, a second signal conducting portion 1012, a ground conducting portion 1013, and conductors 1041 and 1042 of a resonator 1000 may be configured as the hollow type structure. As used herein the term "hollow type" refers to a configuration that may include an empty space inside.

For a predetermined resonant frequency, an active current may be modeled to flow in only a portion of the first signal conducting portion 1011 instead of the entire first signal conducting portion 1011, may be modeled to flow in only a portion of the second signal conducting portion 1012 instead of the entire second signal conducting portion 1012, may be modeled to flow in only a portion of the ground conducting portion 1013 instead of the entire ground conducting portion 1013, and/or may be modeled to flow in only a portion of the conductors 1041 and 1042 instead of the entire conductors 1041 and 1042. When the depth of one or more of the first signal conducting portion 1011, the second signal conducting portion 1012, the ground conducting portion 1013, and the conductors 1041 and 1042 are significantly deeper than a corresponding skin depth in the predetermined resonant frequency, that depth may be ineffective. As a result, the significantly deeper depth may increase the weight or manufacturing costs of the resonator 1000 in some instances.

Accordingly, for the predetermined resonant frequency, the depth of one or more of the first signal conducting portion 1011, the second signal conducting portion 1012, the ground conducting portion 1013, and the conductors 1041 and 1042 may be appropriately determined based on the corresponding skin depth of one or more of the first signal conducting portion 1011, the second signal conducting portion 1012, the ground conducting portion 1013, and the conductors 1041 and 1042. If one or more of the first signal conducting portion 1011, the second signal conducting portion 1012, the ground conducting portion 1013, and the conductors 1041 and 1042 have an appropriate depth deeper than a corresponding skin depth, the resonator 1000 may be manufactured to be lighter in weight, and manufacturing costs of the resonator 1000 may also decrease.

For example, as illustrated in FIG. 10A, the depth of the second signal conducting portion 1012 may be determined as "d" mm, and d may be determined according to $$d = \frac{1}{\sqrt{\pi f \mu \sigma}}.$$

In this example, f denotes a frequency, μ denotes a magnetic permeability, and σ denotes a conductor constant. For example, when the first signal conducting portion 1011, the second signal conducting portion 1012, the ground conducting portion 1013, and the conductors 1041 and 1042 are made of copper and have a conductivity of $5.8 \times 10^7$ siemens per meter (S·m$^{-1}$), the skin depth may be about 0.6 mm with respect to 10 kHz of the resonant frequency, and the skin depth may be about 0.006 mm with respect to 100 MHz of the resonant frequency.

As illustrated in FIG. 10A, the resonator 1000 may include a matcher 1030. Or, as illustrated in FIG. 10B, the resonator 1000 may include a matcher 1050 in which conduction portions 1051 and 1052 of the matcher 1050 may be connected to the capacitor 1020.

Figure 11A:
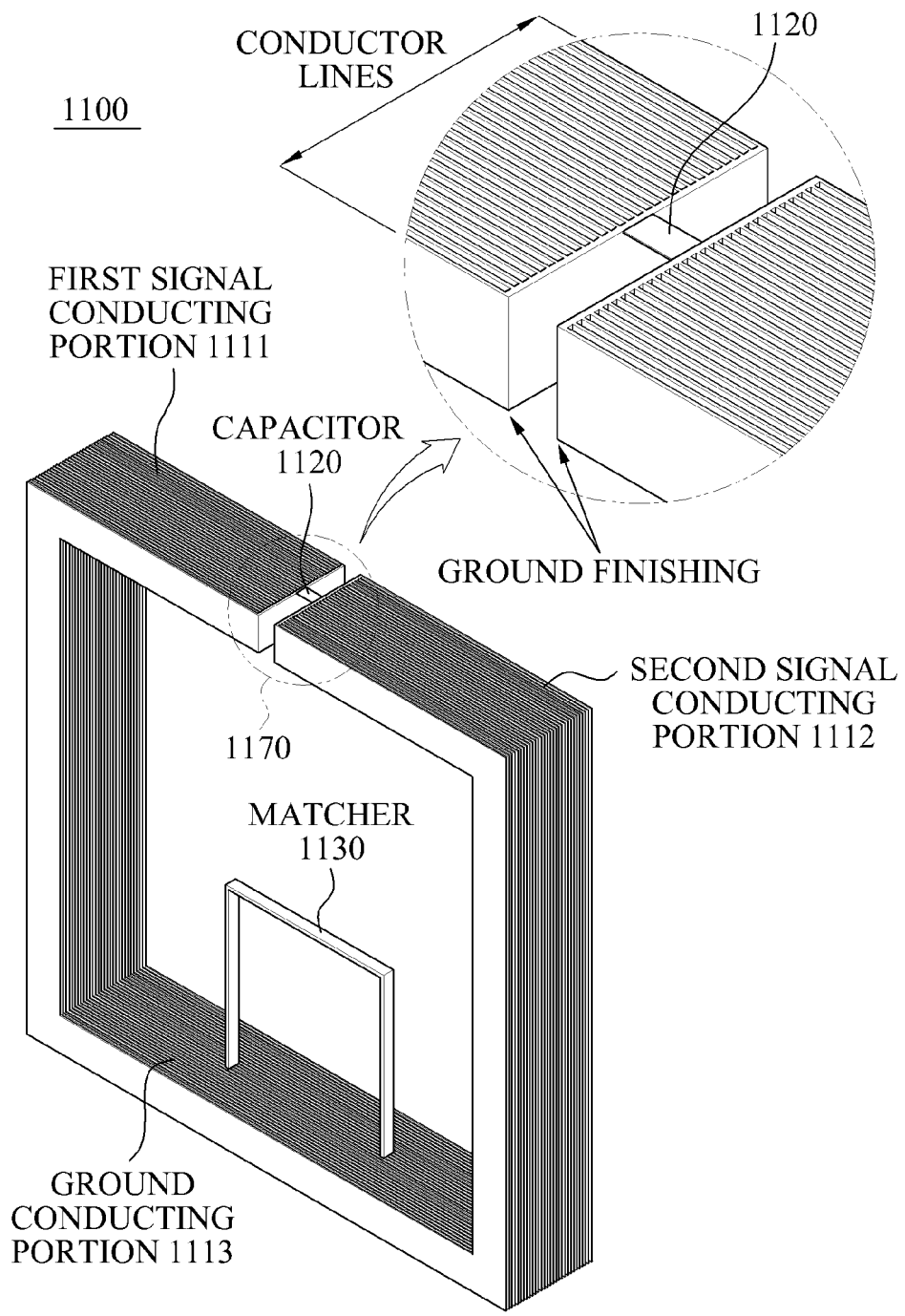
Figure 11B:
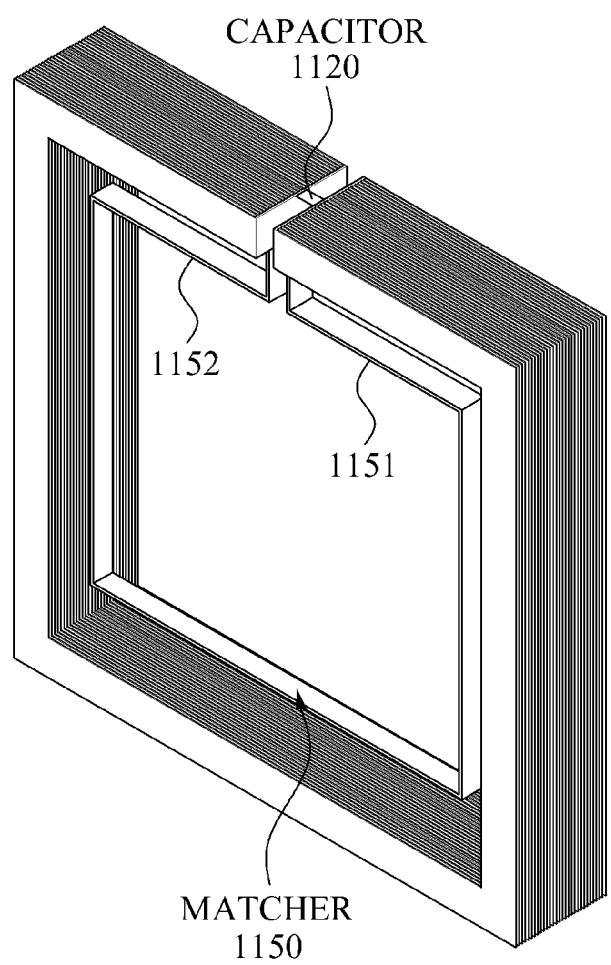

FIGS. 11A and 11B illustrate a resonator for wireless power transmission using a parallel-sheet configuration.

Referring to FIG. 11A, the parallel-sheet configuration may be applicable to one or both of a first signal conducting portion 1111 and a second signal conducting portion 1112 included in a resonator 1100.

The first signal conducting portion 1111 and/or the second signal conducting portion 1112 may not be perfect conductors, and thus may have an inherent resistance. Due to this inherent resistance, an ohmic loss may occur. The ohmic loss may decrease a Q-factor and may also decrease a coupling effect.

By applying the parallel-sheet configuration to each of the first signal conducting portion 1111 and the second signal conducting portion 1112, it may be possible to decrease the ohmic loss, and to increase the Q-factor and the coupling effect. Referring to the enlarge view portion 1170 indicated by a circle in FIG. 11A, in an example in which the parallel-sheet configuration is applied, one of both of the first signal conducting portion 1111 and the second signal conducting portion 1112 may include a plurality of conductor lines. The plurality of conductor lines may be disposed in parallel, and may be electrically connected (i.e., shorted) at an end portion of each of the first signal conducting portion 1111 and the second signal conducting portion 1112.

As described above, if the parallel-sheet configuration is applied to the first signal conducting portion 1111 and the second signal conducting portion 1112, the plurality of conductor lines may be disposed in parallel. Accordingly, the sum of resistances of the conductor lines may decrease. Consequently, the resistance loss may decrease, and the Q-factor and the coupling effect may increase.

As illustrated in FIG. 11A, the resonator 1100 may include a matcher 1130. Or, as illustrated in FIG. 11B, the resonator 1100 may include a matcher 1150, in which conduction portions 1151 and 1152 of the matcher 1150 may be connected to the capacitor 1120.

Figure 12B:
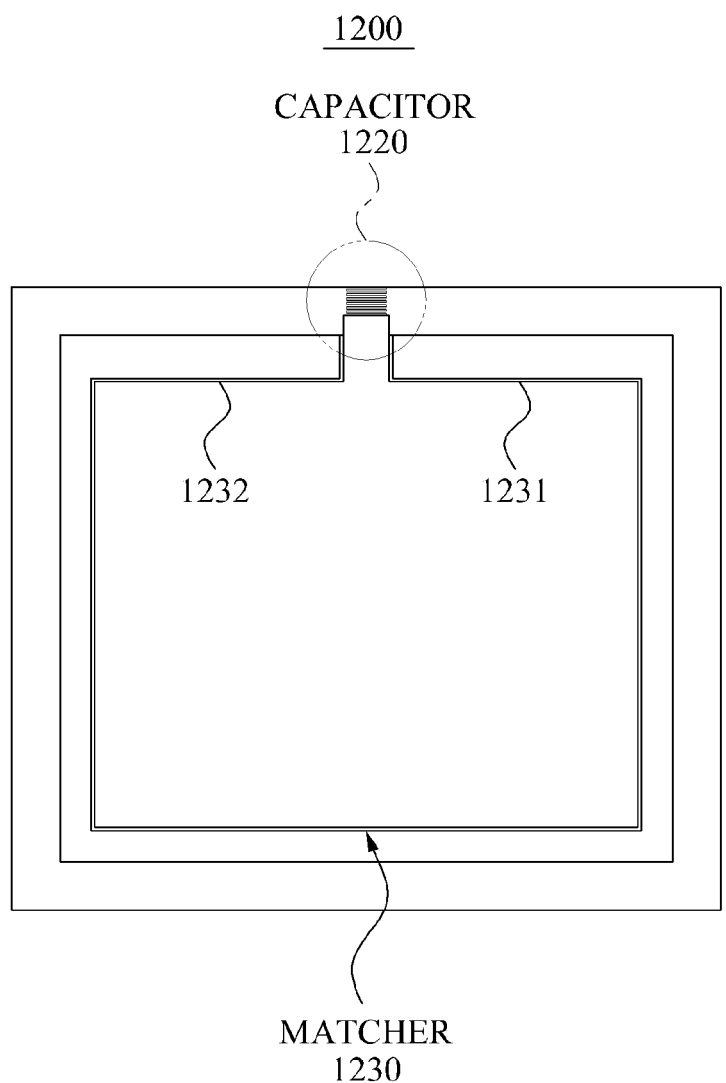

FIGS. 12A and 12B illustrate a resonator for wireless power transmission including a distributed capacitor.

Referring to FIG. 12A, a capacitor 1220 included in a resonator 1200 for the wireless power transmission may be a distributed capacitor. A capacitor used as a lumped element may have a relatively high equivalent series resistance (ESR). A variety of schemes have been proposed to decrease the ESR contained in the capacitor of the lumped element. According to an embodiment, by using the capacitor 1220 as a distributed element, it may be possible to decrease the ESR. As will be appreciated, a loss caused by the ESR may decrease a Q-factor and a coupling effect.

As illustrated in FIG. 12A, the capacitor 1220 as the distributed element may have a zigzagged structure. For example, the capacitor 1220 as the distributed element may be configured with a zigzagged conductive line and a dielectric material.

By employing the capacitor 1220 as the distributed element, it may be possible to decrease the loss occurring due to the ESR. In addition, by disposing, in parallel, a plurality of capacitors as lumped elements, it may be possible to decrease the loss occurring due to the ESR. Since the resistance of each of the capacitors as the lumped elements decreases through a parallel connection, active resistances of parallel-connected capacitors as the lumped elements may also decrease, whereby the loss occurring due to the ESR may decrease. For example, by employing ten capacitors of 1 pF each instead of using a single capacitor of 10 pF, it may be possible to decrease the loss occurring due to the ESR.

As illustrated in FIG. 12B, the resonator 1200 may include a matcher 1230 in which conduction portions 1231 and 1232 of the matcher 1230 may be connected to the capacitor 1220.

Figure 13A:
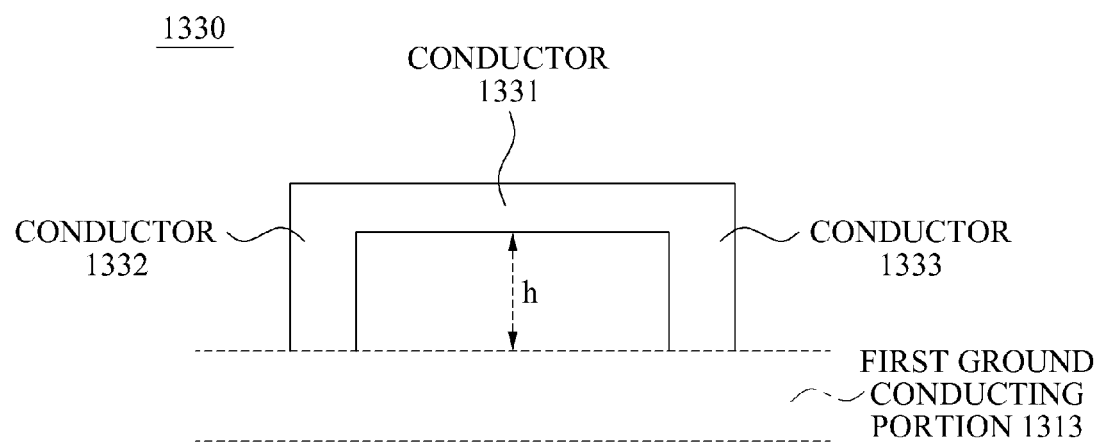
Figure 13B:
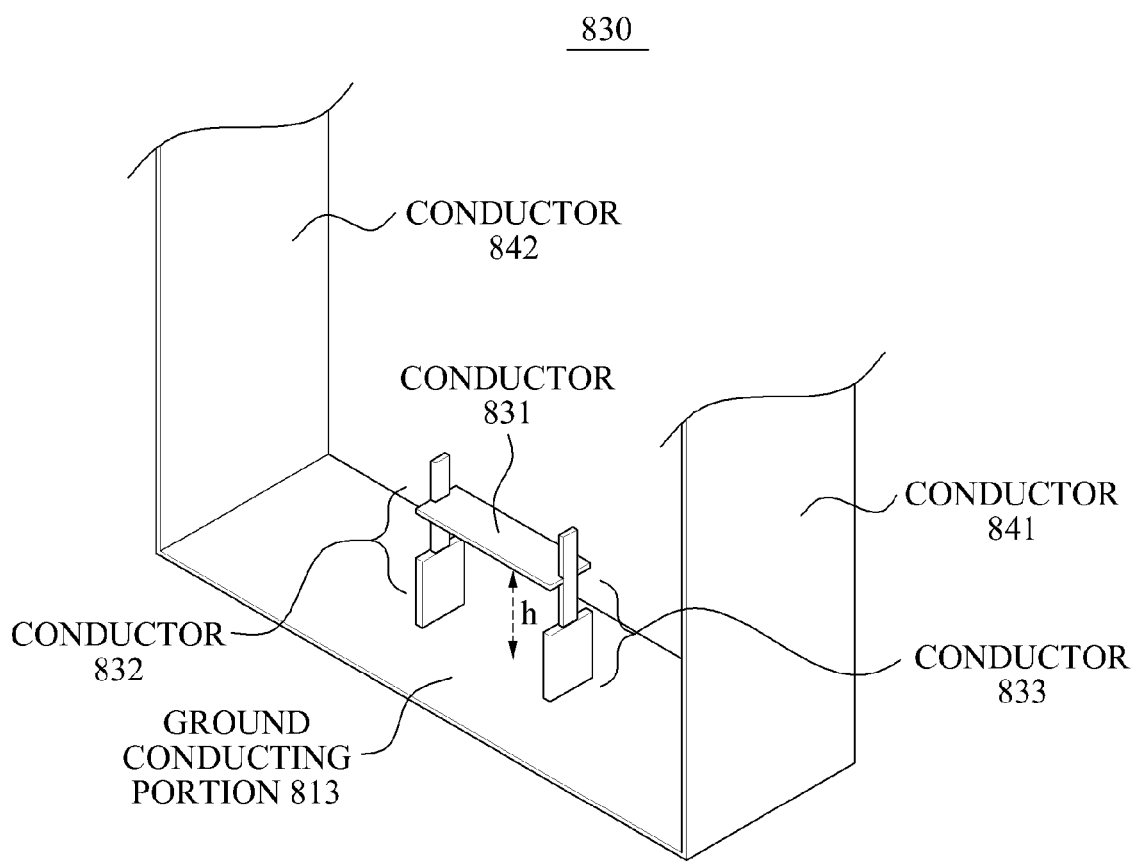

FIG. 13A illustrates a matcher used in a resonator having a 2D structure, and FIG. 13B illustrates a matcher used in a resonator having a 3D structure.

More specifically, FIG. 13A illustrates a portion of a resonator 1300 including a matcher 1330, and FIG. 13B illustrates a portion of the resonator 800 of FIG. 8A including the matcher 830.

Referring to FIG. 13A, the matcher 1330 includes a conductor 1331, a conductor 1332, and a conductor 1333. The conductors 1332 and 1333 may be connected to the conductor 1331, and to a first ground conducting portion 1313 of a transmission line. The matcher 1330 may correspond to the feeder 360 of FIG. 3B. The impedance of the 2D resonator may be determined based on a distance h between the conductor 1331 and the first ground conducting portion 1313. The distance h between the conductor 1331 and the first ground conducting portion 1313 may be controlled by a controller. The distance h between the conductor 1331 and the first ground conducting portion 1313 may be adjusted using a variety of schemes. For example, the variety of schemes may include a scheme of adjusting the distance h by adaptively activating one of the conductors 1331, 1332, and 1333, a scheme of adjusting the physical location of the conductor 1331 up and down, and the like.

Referring to FIG. 13B, the matcher 830 includes the conductor 831, a conductor 832, and a conductor 833. The conductors 832 and 833 may be connected to the ground conducting portion 813 and the conductor 831. The impedance of the 3D resonator may be determined based on a distance h between the conductor 831 and the ground conducting portion 813. The distance h between the conductor 831 and the ground conducting portion 813 may be controlled by the controller. Similar to the matcher 1330 of FIG. 13A, in the matcher 830, the distance h between the conductor 831 and the ground conducting portion 813 may be adjusted using a variety of schemes. For example, the variety of schemes may include a scheme of adjusting the distance h by adaptively activating one of the conductors 831, 832, and 833, a scheme of adjusting the physical location of the conductor 831 up and down, and the like.

In one or more embodiments, the matcher may include an active element. A scheme of adjusting an impedance of a resonator using the active element may be similar to the examples described above. For example, the impedance of the resonator may be adjusted by changing the path of current flowing through the matcher using the active element.

Figure 14:
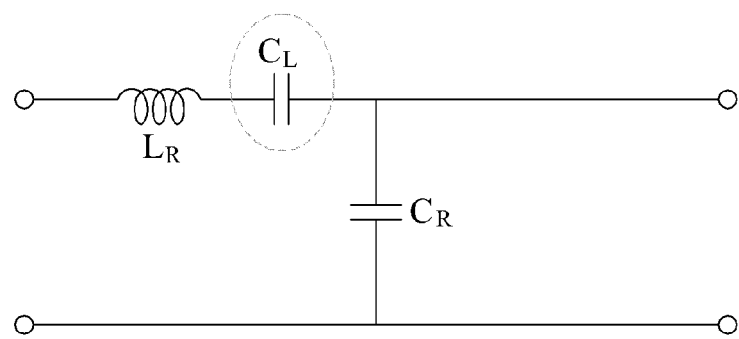
FIG. 14 is a diagram illustrating one equivalent circuit of a resonator of FIG. 8A.

FIG. 14 illustrates one equivalent circuit of the resonator 800 of FIG. 8A.

The resonator 800 used in a wireless power transmission may be modeled to the equivalent circuit of FIG. 14. In the equivalent circuit depicted in FIG. 14, $L_R$ denotes an inductance of the power transmission line, $C_L$ denotes a capacitor that is inserted in a form of a lumped element in the middle of the power transmission line, and $C_R$ denotes a capacitance between the power transmission lines and/or ground of FIG. 8A.

In some instances, the resonator 800 may have a zeroth resonance characteristic. For example, when a propagation constant is "0", the resonator 800 may be assumed to have $\omega_{MZR}$ as a resonant frequency. The resonant frequency $\omega_{MZR}$ may be expressed by Equation 2.

$$\omega_{MZR} = \frac{1}{\sqrt{L_R C_L}} \quad \text{[Equation 2]}$$

In Equation 2, MZR denotes a Mu zero resonator.

Referring to Equation 2, the resonant frequency $\omega_{MZR}$ of the resonator 800 may be determined by $L_R/C_L$. The physical size of the resonator 800 and the resonant frequency $\omega_{MZR}$ may be independent with respect to each other. Since the physical sizes are independent with respect to each other, the physical size of the resonator 800 may be sufficiently reduced.

Figure 15:
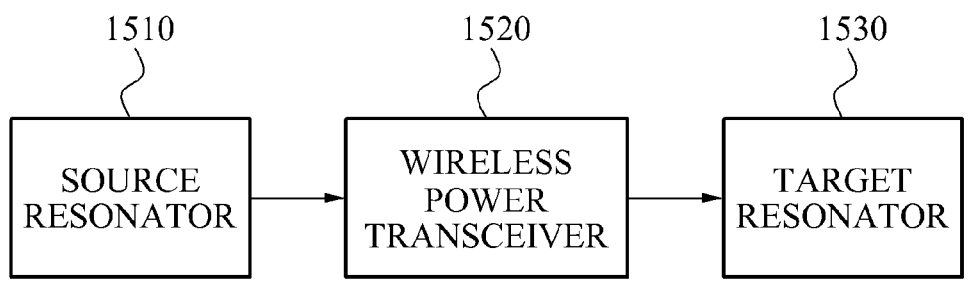
FIG. 15 is a diagram illustrating another wireless power transmission system.

FIG. 15 illustrates another wireless power transmission system.

Referring to FIG. 15, the wireless power transmission system includes a source resonator 1510, a wireless power transceiver 1520, and a target resonator 1530. A reception resonator and a transmission resonator included in the wireless power transceiver 1520, the source resonator 1510, and the target resonator 1530 may be configured, for example, as illustrated in FIGS. 8A through 13B.

The wireless power transceiver 1520 may receive a power from the source resonator 1510, and may transfer the received power to the target resonator 1530. To increase transmission efficiency of the power transmitted from the source resonator 1510 to the target resonator 1530, the wireless power transceiver 1520 may be installed in an optimal position between the source resonator 1510 and the target resonator 1530.

The wireless power transceiver 1520 may include the reception resonator, and the transmission resonator. The reception resonator may receive a wireless power from the source resonator 1510, and the transmission resonator may transmit the wireless power to the target resonator 1530. The reception resonator and the transmission resonator may be implemented, for example, as a single resonator, or as at least two resonators.

Additionally, the wireless power transceiver 1520 may further include a sub-resonator, and a magnetic field distribution controller. The magnetic field distribution controller may control distribution of a magnetic field formed within the transmission resonator in the wireless power transceiver 1520.

The magnetic field distribution controller may be configured to control a direction of current flowing in the transmission resonator, or a direction of current flowing in the sub-resonator, and may control the distribution of the magnetic field formed within the transmission resonator. The direction of the current flowing in the sub-resonator may be determined based on a ratio of the resonant frequency of the sub-resonator with respect to the resonant frequency of the transmission resonator.

The magnetic field distribution controller may control the resonant frequency of the transmission resonator, or the resonant frequency of the sub-resonator. For example, when the resonant frequency of the transmission resonator is equal to the resonant frequency of the sub-resonator, the strength of the magnetic field in the center of the transmission resonator may increase. Thus, the wireless power transmission efficiency of the wireless power transceiver 1520 may be increased. Additionally, due to an increase in the strength of the magnetic field in the center of the transmission resonator, an area enabling transfer of the wireless power may be widened. Also, it may be possible to transmit the wireless power to the target resonator 1530 in a farther distance.

The transmission resonator in the wireless power transceiver 1520 may include the feeding unit 420 of FIGS. 4A and 4B. The feeding unit 420 may enable an input impedance of the transmission resonator to be matched to an output impedance and accordingly, a separate matching network may not be required. Additionally, the feeding unit 420 may enable the strength of the magnetic field to increase in the center of the transmission resonator, and to decrease in outer edges of the transmission resonator.

Figure 16:
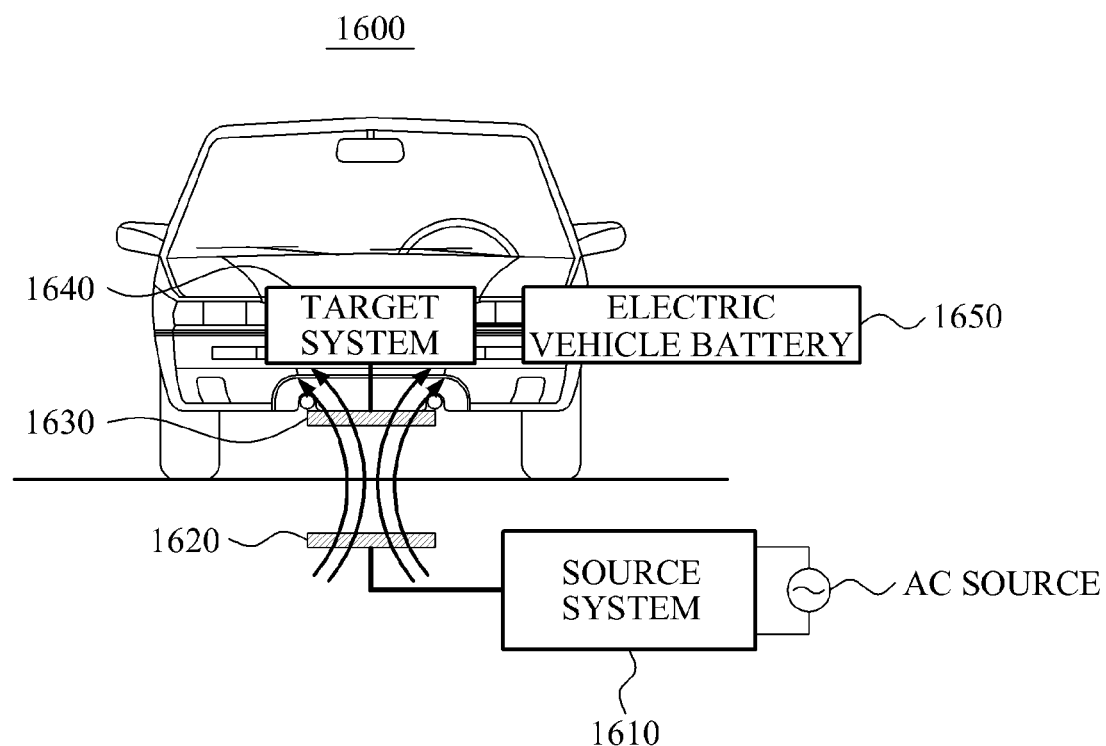
FIG. 16 is a diagram illustrating an electric vehicle charging system.

FIG. 16 illustrates an electric vehicle charging system.

Referring to FIG. 16, an electric vehicle charging system 1600 includes a source system 1610, a source resonator 1620, a target resonator 1630, a target system 1640, and an electric vehicle battery 1650.

The electric vehicle charging system 1600 may have a similar structure to the wireless power transmission system of FIG. 1. The source system 1610 and the source resonator 1620 in the electric vehicle charging system 1600 may function as a source. Additionally, the target resonator 1630 and the target system 1640 in the electric vehicle charging system 1600 may function as a target.

The source system 1610 may include a variable SMPS, a power amplifier, a matching network, a controller, and a communication unit, similarly to the source 110 of FIG. 1. The target system 1640 may include a matching network, a rectification unit, a DC/DC converter, a communication unit, and a controller, similarly to the target 120 of FIG. 1.

The electric vehicle battery 1650 may be charged by the target system 1640.

The electric vehicle charging system 1600 may use a resonant frequency in a band of a few kilohertz (KHz) to tens of MHz.

The source system 1610 may generate power, based on a type of charging vehicle, a capacity of a battery, and a charging state of a battery, and may supply the generated power to the target system 1640.

The source system 1610 may control the source resonator 1620 and the target resonator 1630 to be aligned. For example, when the source resonator 1620 and the target resonator 1630 are not aligned, the controller of the source system 1610 may transmit a message to the target system 1640, and may control alignment between the source resonator 1620 and the target resonator 1630.

For example, when the target resonator 1630 is not located in a position enabling maximum magnetic resonance, the source resonator 1620 and the target resonator 1630 may not be aligned. When a vehicle does not stop accurately, the source system 1610 may induce a position of the vehicle to be adjusted, and may control the source resonator 1620 and the target resonator 1630 to be aligned.

The source system 1610 and the target system 1640 may transmit or receive an ID of a vehicle, or may exchange various messages, through communication.

The descriptions of FIGS. 2 through 15 may be applied to the electric vehicle charging system 1600. However, the electric vehicle charging system 1600 may use a resonant frequency in a band of a few KHz to tens of MHz, and may transmit power that is equal to or higher than tens of watts to charge the electric vehicle battery 1650.

According to various embodiments, in a wireless power transmission system, a feeding unit may enable current in a source resonator to flow in the same direction as current in the feeding unit and thus, it may be possible to omit a matching network used to perform impedance matching between an input impedance of the source resonator and an output impedance of a power amplifier in some instances.

Additionally, a feeding may enable current in a source resonator to flow in the same direction as current in the feeding unit and thus, a magnetic field formed within the source resonator may be uniformly distributed.

Furthermore, it may be possible to increase transmission efficiency of a power transferred to a target device by increasing the strength of a magnetic field formed within a source resonator.

Moreover, it may be possible to match an output impedance of a power amplifier to an input impedance of a source resonator, by adjusting a size of a feeding unit.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmitter comprising:
 a source resonator configured to wirelessly transmit energy to a target device with at least one target resonator, the energy being stored in a capacitor; and
 a feeding unit configured to generate an induced current flowing in the source resonator in the same direction as a direction of an input current flowing in a transmission line, the feeding unit being electrically connected to the capacitor and forming a closed loop with the source resonator,
 wherein, within a first region, a direction of a first magnetic field formed based on the input current is identical to a direction of a second magnetic field formed based on the induced current, and within a second region between the source resonator and the feeding unit, a direction of the first magnetic field is different from a direction of the second magnetic field.

2. The wireless power transmitter of claim 1, wherein the source resonator comprises:
 a first transmission line comprising a first signal conducting portion, a second signal conducting portion, and a first ground conducting portion, the first ground conducting portion corresponding to the first signal conducting portion and the second signal conducting portion;
a first conductor electrically connecting the first signal conducting portion to the first ground conducting portion;
a second conductor electrically connecting the second signal conducting portion to the first ground conducting portion; and
the capacitor inserted between the first signal conducting portion and the second signal conducting portion, in series with respect to current flowing through the first signal conducting portion and the second signal conducting portion.

3. The wireless power transmitter of claim 2, wherein the first transmission line, the first conductor, and the second conductor form a loop structure.

4. The wireless power transmitter of claim 2, wherein the feeding unit comprises:
a second transmission line comprising a third signal conducting portion, a fourth signal conducting portion, and a second ground conducting portion, the second ground conducting portion corresponding to the third signal conducting portion and the fourth signal conducting portion;
a third conductor electrically connecting the third signal conducting portion to the second ground conducting portion;
a fourth conductor electrically connecting the fourth signal conducting portion to the second ground conducting portion;
a fifth conductor electrically connecting the first signal conducting portion to the third signal conducting portion; and
a sixth conductor electrically connecting the second signal conducting portion to the fourth signal conducting portion.

5. The wireless power transmitter of claim 4, further comprising a controller configured to match an input impedance of the source resonator to an output impedance of a power amplifier, by adjusting an area of the second region.

6. The wireless power transmitter of claim 5, wherein the controller determines the input impedance of the source resonator by adjusting the distance between the fourth signal conducting portion and the second ground conducting portion, and the distance between the third conductor and the fourth conductor, or both.

7. The wireless power transmitter of claim 4, wherein the fifth conductor or the sixth conductor is operated as an input port to receive an input of a radio frequency (RF) signal.

8. The wireless power transmitter of claim 4, wherein the fifth conductor and the sixth conductor are connected in parallel to both ends of the capacitor so that current flowing in the fifth conductor is electrically isolated by the capacitor from current flowing in the sixth conductor.

9. The wireless power transmitter of claim 1, wherein the source resonator is configured as a spiral resonator in which a coil is wound in a spiral shape.

10. The wireless power transmitter of claim 9, wherein the spiral resonator comprises a capacitor that is electrically connected between a winding starting end of the coil and a winding finishing end of the coil.

11. The wireless power transmitter of claim 9, wherein the feeding unit is located within the spiral resonator.

12. The wireless power transmitter of claim 9, wherein the feeding unit is located outside the spiral resonator.

13. A wireless power transmission method comprising:
wirelessly transmitting energy to a target device through a magnetic coupling with at least one target resonator, the energy being stored in a capacitor of a source resonator;
generating, by a feeding unit, an induced current flowing in the source resonator in the same direction as a direction of an input current flowing in a transmission line, the feeding unit being electrically connected to both ends of the capacitor and forming a closed loop with the source resonator; and
controlling a magnetic field formed within the source resonator to be uniformly distributed based on a direction of the induced current flowing in the source resonator and a direction of the input current flowing in the feeding unit,
wherein the source resonator comprises:
a first transmission line comprising a first signal conducting portion, a second signal conducting portion, and a first ground conducting portion, the first ground conducting portion corresponding to the first signal conducting portion and the second signal conducting portion;
a first conductor electrically connecting the first signal conducting portion to the first ground conducting portion;
a second conductor electrically connecting the second signal conducting portion to the first ground conducting portion; and
the capacitor inserted between the first signal conducting portion and the second signal conducting portion, in series with respect to current flowing through the first signal conducting portion and the second signal conducting portion, and
wherein the feeding unit comprises:
a second transmission line comprising a third signal conducting portion, a fourth signal conducting portion, and a second ground conducting portion, the second ground conducting portion corresponding to the third signal conducting portion and the fourth signal conducting portion;
a third conductor electrically connecting the third signal conducting portion to the second ground conducting portion;
a fourth conductor electrically connecting the fourth signal conducting portion to the second ground conducting portion;
a fifth conductor electrically connecting the first signal conducting portion to the third signal conducting portion; and
a sixth conductor electrically connecting the second signal conducting portion to the fourth signal conducting portion,
wherein, within a first region, a direction of a first magnetic field formed based on the input current is identical to a direction of a second magnetic field formed based on the induced current, and within a second region between the source resonator and the feeding unit, a direction of the first magnetic field is different from a direction of the second magnetic field.

14. The wireless power transmission method of claim 13, further comprising:
matching an input impedance of the source resonator to an output impedance of a power amplifier, by adjusting an area of a region between the source resonator and the feeding unit.

15. The wireless power transmission method of claim 13, further comprising:

determining the input impedance of the source resonator by adjusting the distance between the fourth signal conducting portion and the second ground conducting portion, the distance between the third conductor and the fourth conductor, or both.

16. A wireless power receiver comprising:

a target resonator configured to wirelessly receive energy from a source resonator; and a feeding unit configured to generate an induced current in the same direction as a direction of an input current flowing in a transmission line of the target resonator, the feeding unit being electrically connected to a capacitor included in the target resonator and forming a closed loop with the target resonator, wherein, within a first region, a direction of a first magnetic field formed based on the input current is identical to a direction of a second magnetic field formed based on the induced current, and within a second region between the target resonator and the feeding unit, a direction of the first magnetic field is different from a direction of the second magnetic field.

17. The wireless power receiver of claim 16, wherein the target resonator comprises:

a first transmission line comprising a first signal conducting portion, a second signal conducting portion, and a first ground conducting portion, the first ground conducting portion corresponding to the first signal conducting portion and the second signal conducting portion;

a first conductor electrically connecting the first signal conducting portion to the first ground conducting portion;

a second conductor electrically connecting the second signal conducting portion to the first ground conducting portion; and the capacitor inserted between the first signal conducting portion and the second signal conducting portion, in series with respect to current flowing through the first signal conducting portion and the second signal conducting portion.

18. The wireless power receiver of claim 17, wherein the feeding unit comprises:

a second transmission line comprising a third signal conducting portion, a fourth signal conducting portion, and a second ground conducting portion, the second ground conducting portion corresponding to the third signal conducting portion and the fourth signal conducting portion;

a third conductor electrically connecting the third signal conducting portion to the second ground conducting portion;

a fourth conductor electrically connecting the fourth signal conducting portion to the second ground conducting portion;

a fifth conductor electrically connecting the first signal conducting portion to the third signal conducting portion; and a sixth conductor electrically connecting the second signal conducting portion to the fourth signal conducting portion.

19. The wireless power receiver of claim 16, further comprising:

a controller configured to match an output impedance of the target resonator to an input impedance of the feeding unit, by adjusting an area of a region between the target resonator and the feeding unit.

\* \* \* \* \*